United States Patent
De

(10) Patent No.: US 10,380,342 B2
(45) Date of Patent: Aug. 13, 2019

(54) KERNEL-BASED DETECTION OF TARGET APPLICATION FUNCTIONALITY USING VIRTUAL ADDRESS MAPPING

(71) Applicant: QUALCOMM INCORPORATED, San Diego, CA (US)

(72) Inventor: Subrato Kumar De, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/245,037

(22) Filed: Aug. 23, 2016

(65) Prior Publication Data

US 2018/0032731 A1 Feb. 1, 2018

Related U.S. Application Data

(60) Provisional application No. 62/368,223, filed on Jul. 29, 2016.

(51) Int. Cl.
*G06F 21/56* (2013.01)
*G06F 11/36* (2006.01)
(Continued)

(52) U.S. Cl.
CPC ........ *G06F 21/566* (2013.01); *G06F 11/3612* (2013.01); *G06F 12/1009* (2013.01);
(Continued)

(58) Field of Classification Search
CPC .. G06F 21/566; G06F 12/1009; G06F 21/563; G06F 2221/033; G06F 2212/1052;
(Continued)

(56) References Cited

U.S. PATENT DOCUMENTS 5,572,590 A 11/1996 Chess
6,477,612 B1 11/2002 Wang et al.
(Continued)

FOREIGN PATENT DOCUMENTS

| WO | 0152022 A2 | 7/2001 |
|----|----|----|
| WO | 2012154996 A1 | 11/2012 |
| WO | 2013164821 A2 | 11/2013 |

OTHER PUBLICATIONS

International Search Report and Written Opinion—PCT/US2017/040492—ISA/EPO —dated Nov. 6, 2017.
(Continued)

*Primary Examiner* — Kambiz Zand
*Assistant Examiner* — Aubrey H Wyszynski
(74) *Attorney, Agent, or Firm* — Smith Tempel Blaha LLC

(57) ABSTRACT

Systems, methods, and computer programs are disclosed for detecting high-level functionality of an application executing on a computing device. One method comprises storing, in a secure memory on a computing device, a virtual address mapping table for an application. The virtual address mapping table comprises a plurality of virtual addresses in the application binary code mapped to corresponding target application functionalities. The application is registered with a high-level operating system (HLOS). During execution of the application binary code, the HLOS detects when one or more of the virtual addresses corresponding to the target application functionalities are executed based on the virtual address mapping table.

30 Claims, 16 Drawing Sheets

(51) Int. Cl.
*G06F 21/53* (2013.01)
*G06F 12/1009* (2016.01)
*G06F 12/12* (2016.01)

(52) U.S. Cl.
CPC .............. *G06F 12/12* (2013.01); *G06F 21/53* (2013.01); *G06F 21/562* (2013.01); *G06F 21/563* (2013.01); *G06F 21/565* (2013.01); *G06F 2212/1052* (2013.01); *G06F 2212/65* (2013.01); *G06F 2221/033* (2013.01); *G06F 2221/034* (2013.01)

(58) Field of Classification Search
CPC .... G06F 21/565; G06F 11/3612; G06F 21/53; G06F 21/562; G06F 2221/034; G06F 2212/65; G06F 12/12
USPC .......................................................... 726/23
See application file for complete search history.

(56) References Cited

U.S. PATENT DOCUMENTS

| | | | |
|---|---|---|---|
| 6,681,331 | B1 | 1/2004 | Munson et al. |
| 6,785,818 | B1 | 8/2004 | Sobel et al. |
| 8,566,935 | B2 | 10/2013 | Lagar-Cavilla et al. |
| 9,178,852 | B2 | 11/2015 | Bettini et al. |
| 9,235,704 | B2 | 1/2016 | Wootton et al. |
| 2002/0032804 | A1 | 3/2002 | Hunt |
| 2002/0178375 | A1 | 11/2002 | Whittaker et al. |
| 2010/0199064 | A1 | 8/2010 | Anderson et al. |
| 2011/0082962 | A1* | 4/2011 | Horovitz ............... G06F 11/301 711/6 |
| 2011/0099387 | A1 | 4/2011 | Gremaud et al. |
| 2012/0240230 | A1 | 9/2012 | Lee |
| 2012/0290848 | A1 | 11/2012 | Wang et al. |
| 2014/0032875 | A1 | 1/2014 | Butler |
| 2015/0089146 | A1 | 3/2015 | Gotwalt et al. |
| 2015/0356451 | A1 | 12/2015 | Gupta et al. |
| 2016/0118121 | A1* | 4/2016 | Kelly .................. G06F 13/4068 710/301 |
| 2018/0032441 | A1 | 2/2018 | De |
| 2018/0032721 | A1 | 2/2018 | De et al. |

OTHER PUBLICATIONS

International Search Report and Written Opinion—PCT/US2017/040495—ISA/EPO—dated Sep. 27, 2017.

* cited by examiner

VIRTUAL ADDRESS-TO-FUNCTION MAPPING TABLE 120

| VA 302 | FUNCTIONAL POINT OF INTEREST 304 |
|---|---|
| 0x3273fa94 | EVAL_FUNCTION |
| 0x3473fac8 | DOCUMENT_WRITE_FUNCTION_START |
| 0x3473fad4 | DOCUMENT_WRITE_1 |
| 0x3473fae8 | DOCUMENT_WRITE_2 |
| 0x29b93420 | ONCLICK_FUNCTION |
| 0x59d782b4 | DOCUMENT_COOKIE_FUNCTION |
| 0x59d78264 | SETTIMEOUT_FUNCTION_START |
| 0x3673fa94 | VM_CODE_SPACE_ALLOCATOR |
| 0x12224ada4 | KERNEL_ALLOCATOR_FUNCTION |
| 0x3673fad4 | VM_CODE_SPACE_DEALLOCATOR |
| 0x12224ae4 | KERNEL_DEALLOCATOR_FUNCTION |

IDENTIFIER-TO-VIRTUAL ADDRESS MAPPING TABLE 122

| MACRO MEANING 604 | VIRTUAL ADDRESSES 602 |
|---|---|
| VM_CODE_SPACE_START | 0x2fa2ca08 |
| VM_CODE_SPACE_END | 0x3473fa80 |
| VM_LARGE_OBJ_SPACE_START | |
| VM_LARGE_OBJ_SPACE_END | |
| VM_NEWSPACE_START | 0x3663fa80 |
| VM_NEWSPACE_END | 0x3663fbb8 |

| Custom Virtual Address Mapping Table with offset and length | | | | | |
|---|---|---|---|---|---|
| Virtual Address for the Web/ Browser Application function doing Buffer or data structure allocation<br><br>(Offline/ Statically Determined & OTA Updated)<br>1102 | Virtual Address for the "kernel system allocators" invoked from Application functions doing Buffer or data structure allocation<br>(Determined during dynamic loading of application)<br>1104 | Buffer Start Virtual Addresses<br><br>(Dynamically determined)<br><br>1106 | Buffer end Virtual Addresses<br><br>(Dynamically determined)<br><br>1108 | member field/ pointer offset within allocated buffer data structure<br>(Offline/ Statically Determined & OTA Updated)<br>(optional)<br>1110 | member Field/ pointer length in bytes within allocated buffer data structure<br>(Offline/ Statically Determined & OTA Updated)<br>(optional)<br>1112 | Is member field a pointer<br><br>(Offline/ Statically Determined & OTA Updated)<br>(optional)<br>1114 |
| 0x3473fa94 | 0x4473fa94 | 0x2fa2ca08 | 0x3473fa80 | ........ | ........ | YES/NO |
| 0x3473fac8 | 0x4473fa94 | 0x3663fa80 | 0x3663fbb8 | ........ | ........ | YES/NO |
| ............ | ............ | ............ | ............ | | | |

*FIG. 11*

| VIRTUAL ADDRESS-TO-FUNCTION MAPPING TABLE 120 | | |
|---|---|---|
| VIRTUAL ADDRESS 302 | MACRO REPRESENTING FUNCTIONAL MEANING 304 | VIRTUAL-ADDRESS FREE 1200 REPRESENTATION USING BYTE-OFFSET |
| ... | ... | ... |
| 0x3133b61c | DOCUMENT_WRITE_FUNCTION_START | BASE2 = BASE0 + 74709000 |
| 0x3133b62c | DOCUMENT_WRITE_1 | BASE2 + 16 |
| 0x3133b640 | DOCUMENT_WRITE_2 | BASE2 + 36 |
| 0x2cbfbe14 | KERNEL_ALLOCATOR_FUNCTION | BASE0 |
| ... | | ... |

*FIG. 13*

Pseudo Binary Code Template 1202

Push_{callSave0, CallSave1, ReturnReg}
AddWord    reg0, ProgCounter, #Const8bits
LoadWord   reg1, [reg0]
LoadWord   reg2, [reg1]
......

LogicalShiftLeft_reg1, reg0, #16
AddWord    reg2, reg1, #4
LoadWord   reg3, [reg2]
AddWord    reg4, reg3, ProgCounter
LoadByte   ArgumentReg0, [reg4]
AddWord    ReturnReg, ProgCounter, #8
BranchDir  (ProgCounter + #Const20bits)
......

AddWord_reg0, ProgCounter, #Const8bits
LoadWord   reg2, [reg0]
AddWord    reg1, reg2, ProgCounter
LoadWord   ArgumentReg0, [reg1]
AddWord    ReturnReg, ProgCounter, #8
BranchDir  (ProgCounter + #Const20bits)
Compare    ReturnValueReg0, #0
BranchEQ   (ProgCounter + #12)
Compare    ReturnValueReg0, #1
BranchNE   (ProgCounter + #Const5Bits)

VIRTUAL ADDRESS-TO-FUNCTION MAPPING TABLE 120

| VIRTUAL ADDRESS 302 | MACRO REPRESENTING FUNCTIONAL MEANING 304 |
|---|---|
| 0x3473fac8 | DOCUMENT_WRITE_FUNCTION_START |
| 0x3473fad4 | DOCUMENT_WRITE_1 |
| 0x3473fae8 | DOCUMENT_WRITE_2 |
| 0x30000000 | KERNEL_ALLOCATOR_FUNCTION |

*FIG. 14*

UPDATED VERSION OF APPLICATION BINARY
1204

```
3133b608:  mov    r0, r5
3133b60c:  mov    r1, r4
3133b610:  mov    r3, r6
3133b614:  ldmia.w sp!, {r4, r5, r6, lr}
3133b618:  bx     r3
3133b61c:  push   {r4, r5, lr}
3133b620:  ldr    r4, [pc, #64]
3133b624:  ldr    r4, [r4, #0]
3133b628:  ldr    r1, [pc, #60]
3133b62c:  lsl    r7, r1, #16
3133b630:  ldr    r3, [r7, #4]
3133b634:  add    r3, pc
3133b638:  ldrb   r3, [r3, #0]
3133b63c:  bl     314a8abc
3133b640:  ldr    r1, [pc, #80]
3133b644:  add    r1, pc
3133b648:  ldr    r0, [r1, #0]
3133b64c:  blx    314a6cbc
3133b650:  cmp    r0, #0
3133b654:  beq    3133b660
3133b658:  cmp    r0, #1
3133b65c:  bne    3133b674
3133b660:  bl     313ca924
3133b664:  ldr    r3, [r0, #0]
3133b668:  mov    r0, #64
3133b66c:  ldr    r6, [r3, #0]
3133b670:  bl     3146e548
3133b674:  movs   r1, #0
3133b678:  movs   r2, #64 ; 0x40
```

Pseudo Binary Code Template 1202

```
Push    {callSave0, callSave1, ReturnReg}
AddWord  reg0, ProgCounter, #Const8bits
LoadWord reg1, [reg0]
LoadWord reg2, [reg1]
...

LogicalShiftLeft reg1, reg0, #16
AddWord  reg2, reg1, #4
LoadWord reg3, [reg2]
AddWord  reg4, reg3, ProgCounter
LoadByte ArgumentReg0, [reg4]
AddWord  ReturnReg, ProgCounter, #8
BranchDir (ProgCounter + #Const20bits)

AddWord  reg0, ProgCounter, #Const8bits
LoadWord reg2, [reg0]
AddWord  reg1, reg2, ProgCounter
LoadWord ArgumentReg0, [reg1]
AddWord  ReturnReg, ProgCounter, #8
BranchDir (ProgCounter + #Const20bits)
Compare  ReturnValueReg0, #0
BranchEQ (ProgCounter + #12)
Compare  ReturnValueReg0, #1
BranchNE (ProgCounter + #Const5bits)
...
```

*FIG. 15*

KERNEL-BASED DETECTION OF TARGET APPLICATION FUNCTIONALITY USING VIRTUAL ADDRESS MAPPING

PRIORITY CLAIM AND CROSS-REFERENCE TO RELATED APPLICATION

This patent application claims priority under 35 U.S.C. § 119(e) to U.S. Provisional Application Ser. No. 62/368,223, filed Jul. 29, 2016, entitled, "KERNEL-BASED DETECTION OF TARGET APPLICATION FUNCTIONALITY USING VIRTUAL ADDRESS MAPPING," the entire contents of which are hereby incorporated by reference.

DESCRIPTION OF THE RELATED ART

There are various high level applications running on a hardware platform that does not show any noticeable activity at the system or platform layer and hence provides no opportunities to detect useful functional and behavioral information of the application execution.

A common example being high level Web browser application on being compromised with security exploits (e.g., Cross Site Scripting) during it's execution on the device that do not leave any indicative trace at the system and the platform level. There is no way to determine that such an activity is happening on the high level application by probing either the system libraries, the platform, the SOC hardware, or watching the device level activities.

Hence to have better platform level control on various third party applications running on the device and to detect some of the functional and behavioral activities of these executing high level applications, there is a need to develop a mechanism that enables expressing and communicating the high level application functionalities and behavior into a form that the platform's HLOS or kernel can understand. This will allow the platform to have better understanding on the executing application's behavior and allow the platform to take decisions and actions to handle various different situations of the executing applications.

As an example a platform level decision to prevent a Web Security exploit on a third party web browser application can be taken using the information. Other areas of example uses are the platform taking decisions like increasing/decreasing the frequencies of various SOC components (DDR, Bus, CPU, Caches) or engage high or low power modes once a specific functional or behavioral nature of the application is detected using the mechanisms in this disclosure at the HLOS or kernel layer. In general with this disclosure the platform gets the opportunity to do various controls on the various third party applications executing on the device by detecting and recognizing the functionality being executed by the application. This allows SOC and platform vendors to provide a better solution from the platform level for various third party applications on which the platform otherwise have no control over.

SUMMARY OF THE DISCLOSURE

Systems, methods, and computer programs are disclosed for detecting high-level functionality of an application executing on a computing device. One method comprises storing, in a secure memory on a computing device, a virtual address mapping table for an application. The virtual address mapping table comprises a plurality of virtual addresses in the application binary code mapped to corresponding target application functionalities. The application is registered with a high-level operating system (HLOS). During execution of the application binary code, the HLOS detects when one or more of the virtual addresses corresponding to the target application functionalities are executed based on the virtual address mapping table.

Another embodiment is a system comprising a processing device and a high-level operating system (HLOS). The processing device is configured to execute application binary code. The HLOS comprises a virtual address mapping table comprising a plurality of virtual addresses in the application binary mapped to corresponding target application functionalities. The HLOS I configured to detect when one or more of the virtual addresses corresponding to the target application functionalities are executed.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 6 illustrates an embodiment of an identifier-to-virtual mapping table (IVAMT) used in combination with a VAFMT.

FIG. 11 illustrates an embodiment of a VAFMT comprising virtual addresses for specific buffer allocator functions that are used to determine the virtual addresses of dynamically allocated buffers containing objects of specific data structure types and values of members/fields of the objects allocated in the buffer.

FIG. 13 illustrates the VAFMT of FIG. 12 with updated virtual addresses and metadata.

FIG. 14 illustrates an exemplary matching of functional points of interest in the VAFMT of FIG. 12 to a pseudo binary code template.

FIG. 15 illustrates an exemplary matching of the pseudo binary code template of FIG. 14 to a matched region in the updated version of the application binary code.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
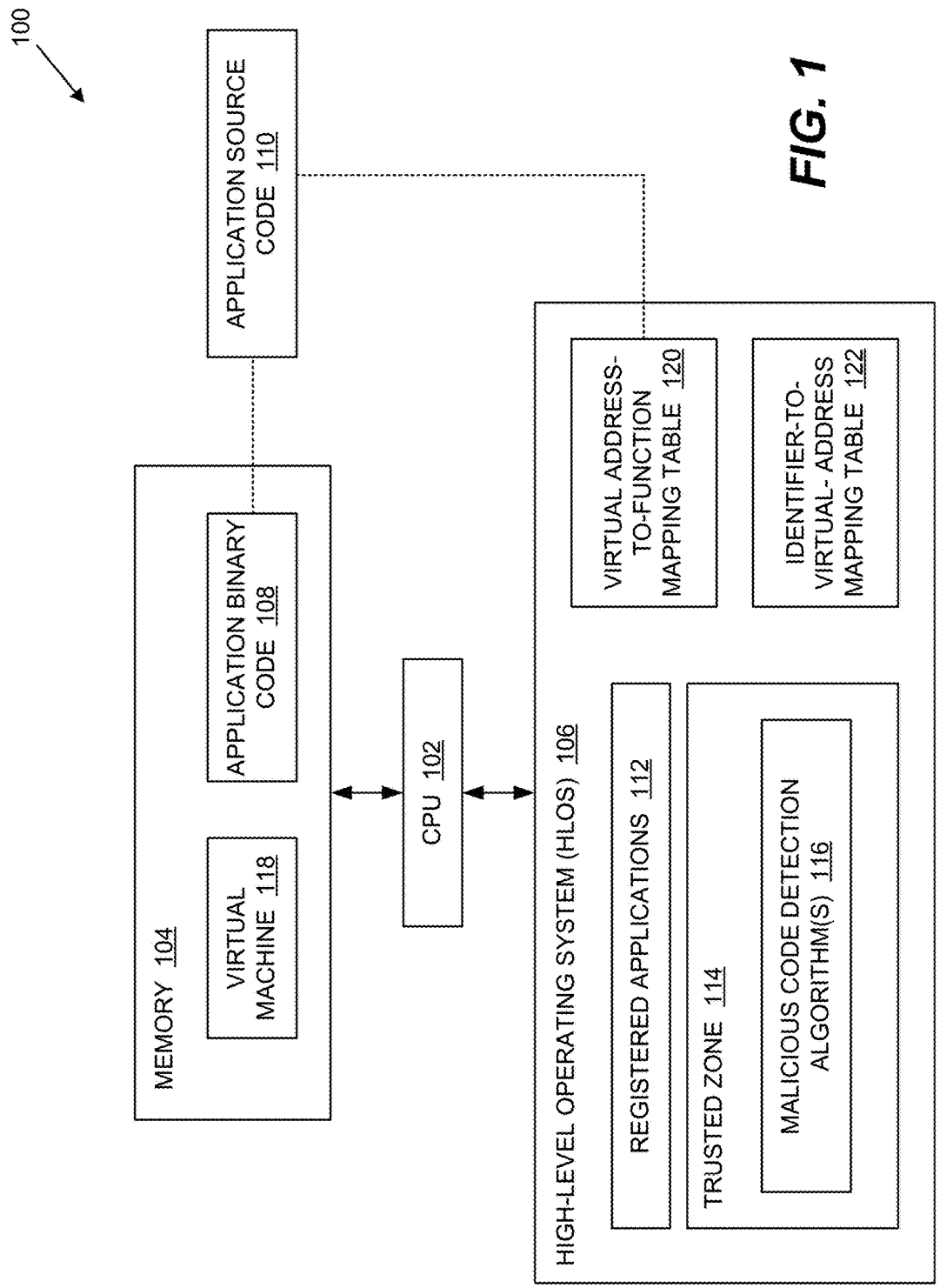
FIG. 1 is a block diagram of an embodiment of a system for detecting target application functionality using virtual address mapping in a secure memory.

FIG. 1 illustrates an embodiment of a system 100 for detecting desired or target high-level functionalities of an application binary from a kernel or operating system (O/S) layer. As illustrated in the embodiment of FIG. 1, the system 100 comprises a processing device (e.g., a central processing unit (CPU) 102), a memory 104, and a high-level operating system (HLOS) 106. The memory 104 stores one or more applications that may be executed by the CPU 102. The memory 104 may store the application binary code 108 corresponding to reference application source code 110 associated with the application(s) installed on a computing device. In this regard, the system 100 may be implemented in any desirable computing device or system, including, for example, a personal computer, a laptop computer, a workstation, a server, or a portable computing device (PCD), such as a cellular telephone, a smart phone, a portable digital assistant (PDA), a portable game console, a navigation device, a tablet computer, a wearable device (e.g., smart watch), or other battery-powered portable device.

In an embodiment, the kernel or O/S layer comprises a high-level operating system (HLOS) 106. As illustrated in FIG. 1, the HLOS 106 comprises a list of registered applications 112, a secure memory (e.g., a trusted zone 114), and specially configured virtual address mapping table(s) for the application binary code 108 of each registered application. The list of registered applications 112 identifies applications installed on the system 100 that have been registered with the HLOS 106 for secure control and/or support. For example, the application binary code 108 of an application (e.g., a web application, a browser application, etc.) may be registered with the HLOS 106 and identified in the list 112. As known in the art, the trusted zone 114 comprises a secure memory or area configured to guarantee that code and/or data loaded into memory and/or executed is protected with respect to security, confidentiality, integrity, etc. The application binary code 108 for the registered application(s) may have one or more virtual address mapping table(s), which are used by the HLOS 106 and/or the algorithms in the trusted zone 114 to identify desired or target high-level application functionalities by tracking the execution of predetermined virtual address points.

It should be appreciated that the system 100 may be applied to various application domains in which tracking and detecting high-level application functionalities at the kernel layer is advantageous. For example, in one exemplary embodiment, the kernel may control decisions, such as, increasing and/or decreasing the frequency of various system on chip (SoC) components (e.g., a central processing unit (CPU), cache(s), double data rate (DDR) memory, one or more buses, etc.) or set high and/or low power modes and enable/disable specific hardware features in response to the detection of specific functional or behavioral nature of executing applications. In this manner, the HLOS 106 and the kernel has the opportunity to implement various controls on the various third party applications executing on the device by detecting and recognizing the functionality being executed by the application. It should be appreciated that this may allow the SoC and platform vendors to provide improved solutions from the platform/HLOS/kernel level for various third party applications on which the platform otherwise may have no control.

In an exemplary application domain, the system 100 may provide real-time security protection against malicious attacks or other exploits of web applications, web browsers, JavaScript code, etc. As known in the art, JavaScript is the programming language used in many websites and web applications, JavaScript-based attacks are one of the top threats for cyber security. As more and more web activity shifts from desktop computers to mobile, JavaScript attacks are becoming a major threat on portable computing devices.

Most malicious JavaScript attacks utilize the characteristics of the JavaScript language and the constraints of web standards and specifications for the exploits. Common examples of web-based exploits through malicious JavaScript include the following: cross-site scripting (i.e., XSS/CSS), cross-site request forgery (i.e., CSRF/XSRF), drive-by downloads, user intent hijacking, clickjacking, distributed Denial of Service (DDoS), JavaScript steganography, and various forms of obfuscated JavaScript. Because high-level web behavior and functionality knowledge is needed in the attempt to detect malicious behaviors, current web and JavaScript security solutions are typically built within the browser software architecture.

In-built web security mechanisms within the HLOS, kernel and the device platform, however, are limited because web/JavaScript-based exploits may have no visible indication on the platform activity (e.g., system calls, device usage, etc.). Many web/JavaScript-based attacks are outward-facing and only compromise the user's online assets, activity, identity, etc. In other words, the visible activity patterns may only be detected within the web browser/application software and hence most security mechanisms against web exploits are almost always built within the web browser application.

In this regard, exemplary embodiments of the application binary code 108 in system 100 may comprise web applications, browser applications, or other applications in which the HLOS 106 detects high-level application functionalities by tracking predetermined virtual address points. As further illustrated in FIG. 1, the system 100 may further comprise one or more malicious code detection algorithms 116 residing in the trusted zone 114. The malicious code detection algorithms 116 may receive data related to execution of the virtual address points and their associated functional meanings as identified in the virtual address mapping tables. Based on this data, the algorithm(s) 116 may detect, for example, malicious code and behavior, malicious JavaScript code and execution, etc. and initiate appropriate methods for resolving the security threat or otherwise thwarting the malicious attack. In an embodiment, when a security threat is detected, the system 100 may automatically resolve the threat or prompt a user for appropriate action(s).

As illustrated in the embodiment of FIG. 1, the virtual address mapping tables used by the HLOS 106 may comprise a virtual address-to-function mapping table 120 and an identifier-to-virtual address mapping table 122. It should be appreciated that the HLOS 106 and the mapping tables 120 and 122 comprise an integrated platform mechanism by which the system 100 may determine desired or target high-level functional information from the executing application binary code 108. The high-level functional information may be used by algorithm(s) and/or model(s) (e.g., malicious code detection algorithm(s) 116) implemented in the trusted zone 114 to detect malicious behavior.

As described below in more detail, the system 100 may support two different execution models for executing the application binary code 108. A first execution model involves native binary execution (e.g., from C/C++ code). A second execution model involves managed runtime execution (e.g., execution by a virtual machine 118). In an embodiment, the virtual machine 118 may execute dynamic just-in-time (JIT) or interpreted code from JavaScript sources. In managed runtime execution embodiment, the virtual machine 118 may comprise part of the binary code 108 in which the virtual machine 118 runs within the binary code 108. It should be appreciated, however, that in other embodiments there may be separate VM and binary workloads.

Figure 2:
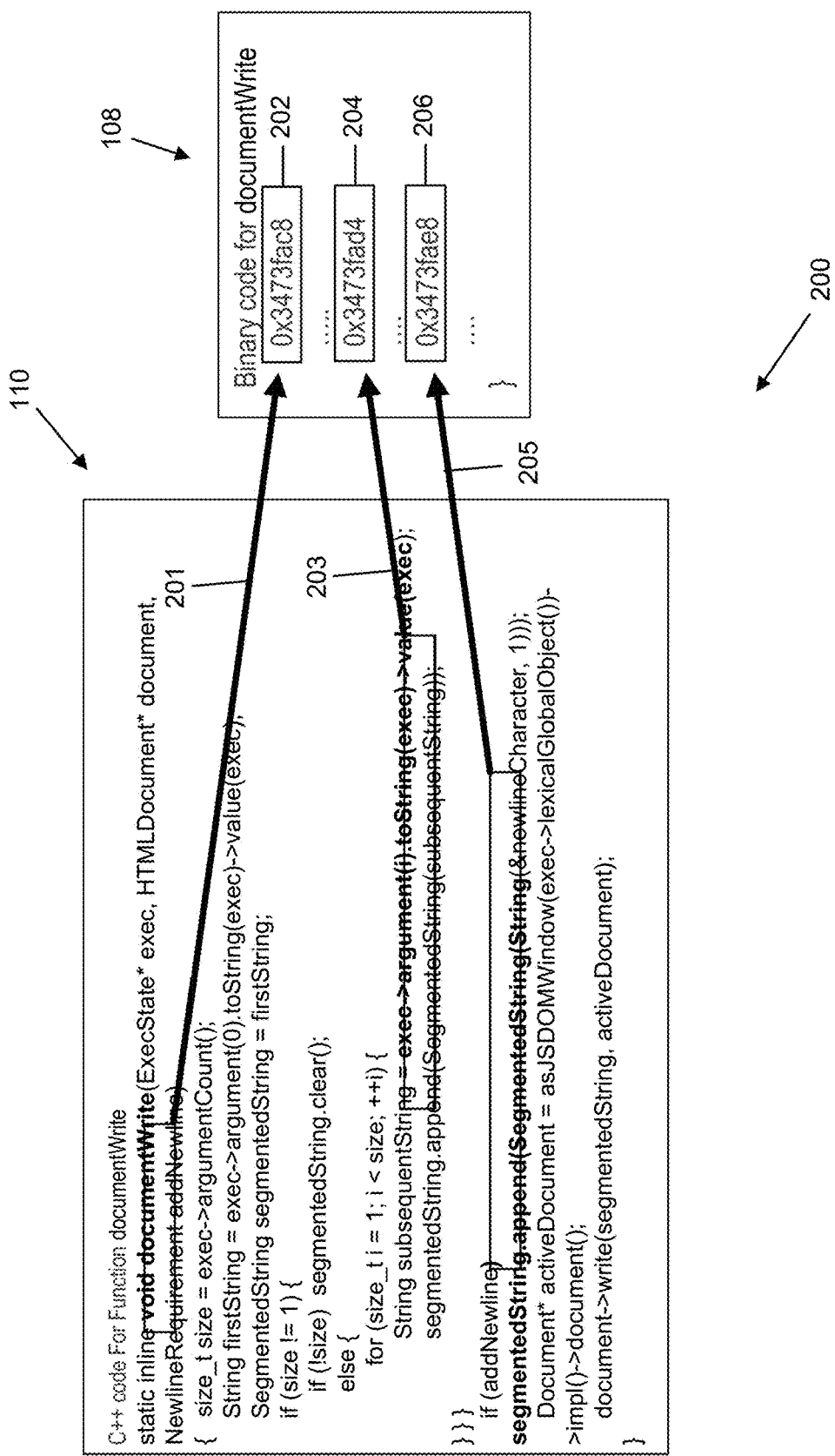
FIG. 2 illustrates an exemplary mapping of target application functionality to the corresponding application binary code.
Figure 3:
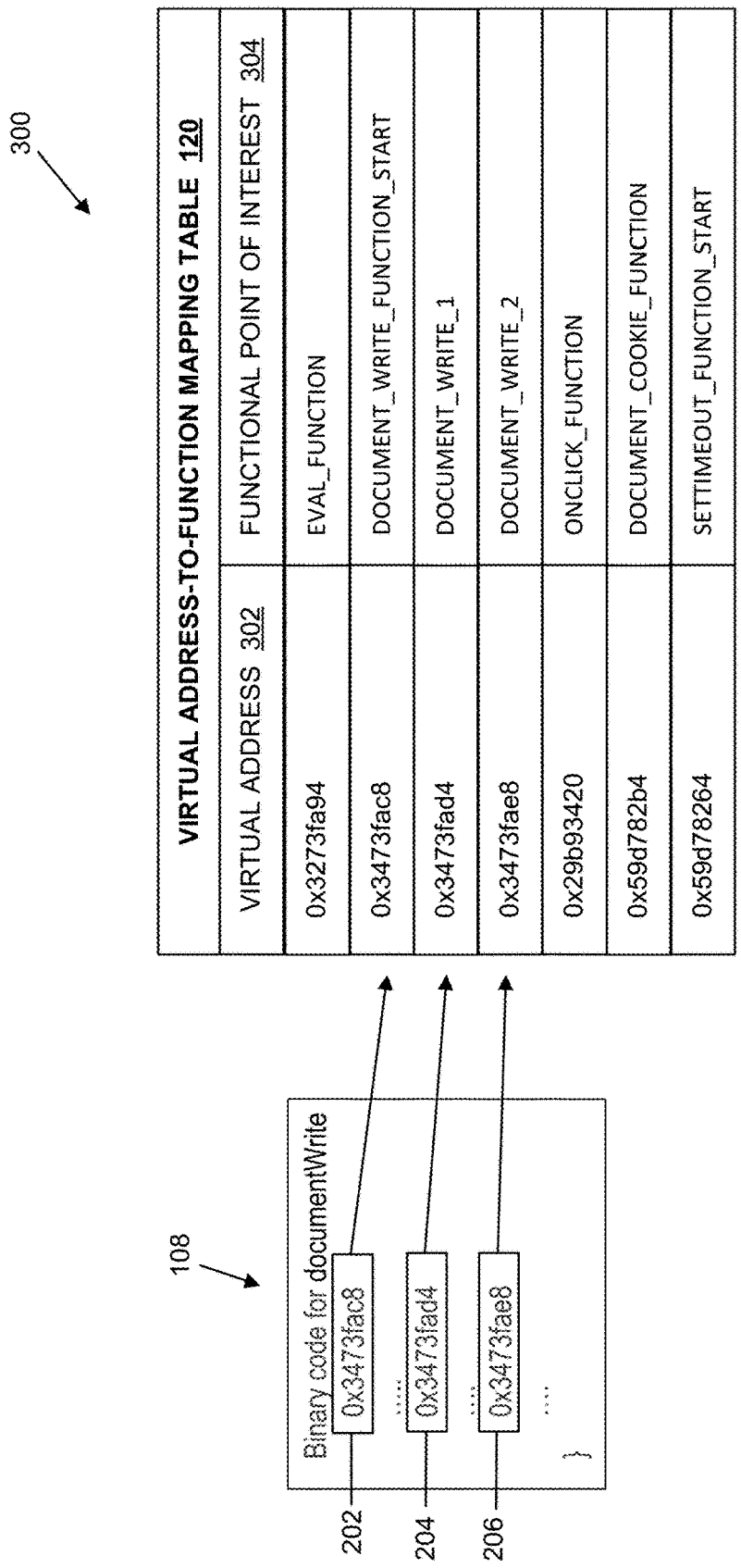
FIG. 3 illustrates an exemplary embodiment of a virtual address-to-function mapping table (VAFMT).
Figure 4:
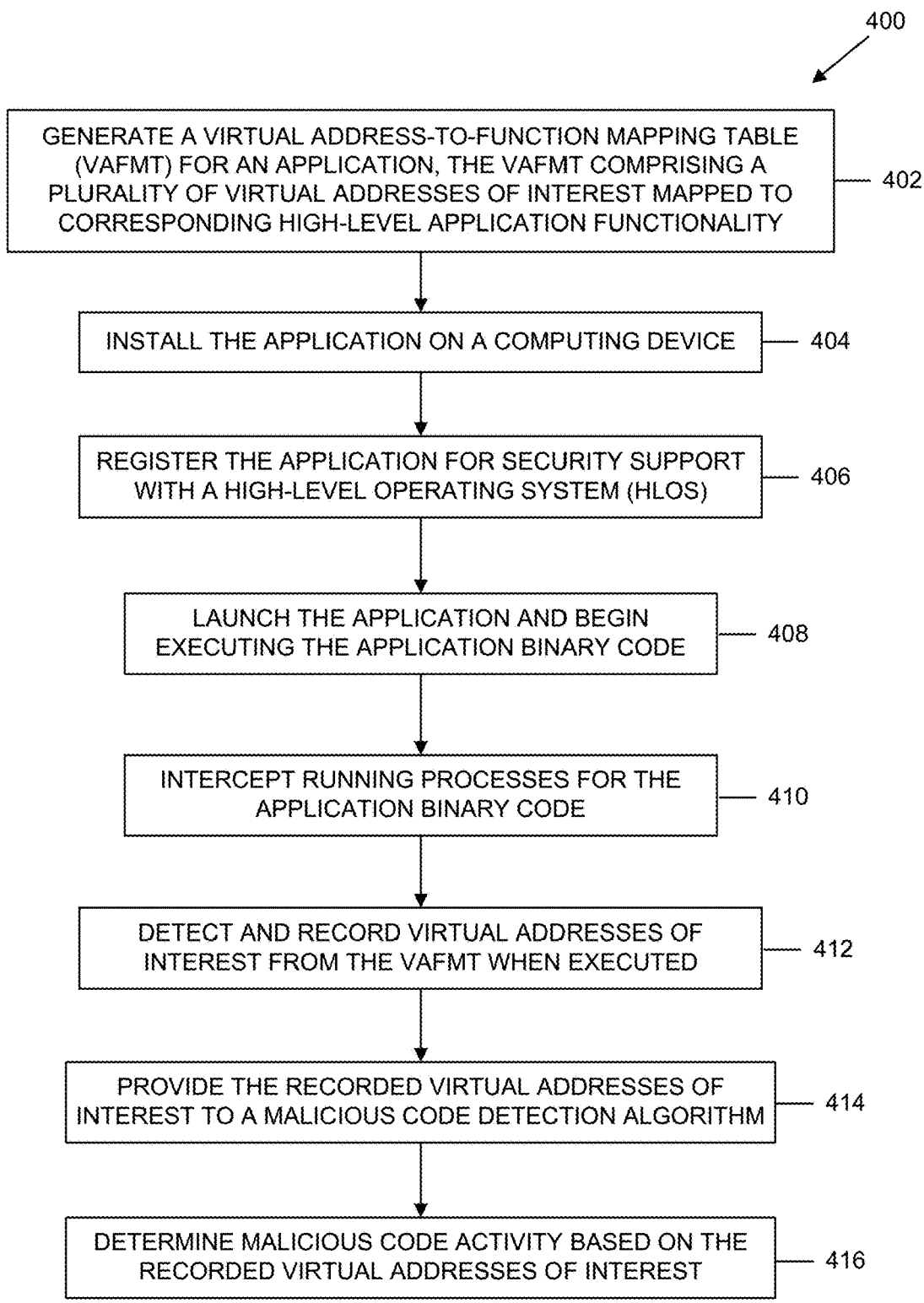
FIG. 4 is a flowchart illustrating an embodiment of a method for detecting malicious code activity in the system of FIG. 1.

An exemplary embodiment of the native binary execution model is illustrated in FIGS. 2-4. For native binary execution, each application in the list of registered applications 112 has a corresponding VAFMT 120, which is maintained by the HLOS 106. The VAFMT 120 may reside in the trusted zone 114. The VAFMT 120 comprises different virtual addresses of interest mapped with their associated high-level functionality. In an embodiment, each associated high-level functionality may be denoted as a macro name that the algorithm(s) 116 understand. It should be appreciated, however, that other mechanisms for representing the associated high-level functionality may be implemented, including, for example, pointers to functions or function names in the algorithms 116 such that the activity detected at a particular virtual address directly corresponds to a functionality that needs to be triggered in the algorithm(s) 116. The virtual addresses of the specific application functions (and specific points within functions) in a binary image may be referred to as "points of interest". In an embodiment, virtual address points of interest may comprise points within, at the start, or at the end of, or multiple specific points in between, for example, sensitive sources/sinks routines, dangerous web application program interfaces (APIs), specific web functionality, start/end of buffers, or any other objects that an attacker may exploit or other suitable information for the analysis and detection of known web/JavaScript attacks. In other embodiments, the virtual address points of interest may comprise points in the implementation of a JavaScript interpreter, just-in-time (JIT) compiler, or a runtime environment (e.g., allocation/deallocation functions for a virtual machine heap that stores JavaScript source code, bytecode/JITcode, etc.

FIGS. 2 and 3 illustrate an exemplary embodiment of a VAFMT 120. FIG. 2 illustrates a logical mapping 200 of certain desired or target functionality points within the application source code 110 to the corresponding virtual address points within the application binary code 108. In FIGS. 2 & 3, the virtual addresses are shown but the binary object code is not shown. In this embodiment, the application source code 110 comprises C++ code for a "document-Write" function. The point 201 in the source code is mapped to a virtual address 202 in the binary code. The point 203 in the source code is mapped to the virtual address 204 in the binary code. The point 205 of the source code is mapped to the virtual address 206 in the binary code. FIG. 3 illustrates a logical mapping 300 of the virtual addresses in the binary code 202, 204, and 206 that are under the column 302 in the VAFMT 120 to the respective functional meanings that the code at those virtual addresses represent. As illustrated in FIG. 3, the VAFMT 120 may comprise a plurality of virtual addresses (column 302) with a corresponding description of the functional point of interest (column 304). The virtual address (0x3273fa94) represented by 202 for the binary code point is mapped to a functional point corresponding to the EVAL_FUNCTION. The virtual address (0x3473fac8) represented by 204 for the binary code point corresponding to the functional point of interest that denotes DOCUMENT_WRITE_FUNCTION_START. The virtual address (0x3473fad4) represented by 206 in the binary code is mapped to a for the functional point that has a macro meaning DOCUMENT_WRITE_1.

FIG. 11 illustrates an embodiment of a VAFMT 120 comprising a custom virtual address table that has virtual addresses for specific buffer allocator functions that may be used to determine virtual addresses of the start and the end of the dynamically allocated buffers comprising objects of specific data structure types (e.g., class, structure, union). The values of the members/fields of the objects allocated in the buffer may be determined using the offset and the length fields, which may also be maintained in the table for a particular field/member that is a point of interest. The virtual addresses of the buffer allocation functions may be used to detect the size and the addresses of the allocated buffer by, for example, tracking the execution of the system memory allocator functions from the region covered by the virtual addresses of the allocator functions. Once the buffer start and end virtual addresses are known, the offset and the length fields may be used to determine the value of a particular member/field of the objects for the particular data structure type.

As illustrated by the dashed lines in FIG. 1, the application source code 110 need not be stored in the system 100. Rather, it may be located off-line or off-device and available as reference or open source code. The reference source code for a particular version can be used as reference and guidance to determine the virtual addresses of interest in the actual commercial binary of the browser or the web applications. An equivalent binary may be compiled from the open source project's matching code revision/version. The compiled binary may be used as a reference to detect the desired or target virtual addresses and functions/points of the application binary that is based on that version/revision. Similar compiler and linker options may be used. Furthermore, breakpoints at various points in the application code can be used for the determination of the virtual addresses and their functional mapping points. Binary code recognition and similarity extraction methods may be utilized to identify the functionalities in the given application binary by using the reference binary from the known compiled functions for the open source project. For binaries with slightly modified versions (or binaries originating from a source base with some source code differences from the known reference open source projects), test codes may be written that invoke the important web functions and APIs. The virtual address access sequences from various test cases may be used to converge to a set of target virtual address points. It should be appreciated that other mechanisms may be used to extract functionality from the application binary code.

FIG. 4 is a flowchart illustrating an embodiment of a method 400 for detecting malicious code activity in a native binary execution model. At block 402, a VAFMT 120 is generated for an application. As described above, the VAFMT 120 comprises a plurality of virtual addresses of interest mapped to corresponding high-level application functionality. At block 404, the application may be installed on a computing device, such as, for example, a portable computing device. At block 406, the application may be registered for security support provided by the HLOS 106 (e.g., registered applications 112). At block 408, the application may be launched and, in response, the CPU 102 may execute the application binary code 108. When a registered application 112 runs, the HLOS 106 may intercept the application's running processes (block 410). At block 412, the HLOS 106 may use the corresponding VAFMT 120 to detect and record the functional points of interest as they are executed. At block 414, the recorded points may be provided to the malicious code detection algorithm(s) 116 to detect and resolve malicious attacks. The malicious code detection algorithm(s) 116 may comprise signature-based algorithm(s), pattern matching algorithms, or employ machine learning, or other techniques. In this manner, the malicious code detection algorithm(s) 116 may use the VAFMT 120 to provide the meaning of the virtual addresses it receives as input.

Because the VAFMT 120 is under the control of the HLOS 106, any transformation/randomization of the virtual addresses of the application binary code 108 performed by the HLOS 106 (e.g., address space layout randomization (ASLR)) may be applied to the virtual addresses in VAFMT 120 to keep them in synchronization with the effective virtual address of the executing application. In an embodiment, the information gathered from the JavaScript code and the application execution with the VAFMT 120 may provide the high-level web/JavaScript functionality information, which can be fed to the malicious code detection algorithms 116. Upon detecting any malicious behavior (block 416), the HLOS 106 may pause the application/renderer/JavaScript process and open a dialog box for the user, warning about the potential danger, and asking the user for instructions for proceeding. If the user still wants to proceed, the browser process may be resumed by the HLOS 106. If the user does not want to proceed, the HLOS 106 may ask the user to close the tab or navigate to some other website, or the HLOS 106 may end the process for that execution instance (browser tab).

The VAFMT 120 may be updated via, for example, over-the-air (OTA) updates when the application binary code 110 version changes. These updates ensure the HLOS 106 is ready with updated binaries for any registered applications 112. The updated binaries may yield new virtual addresses for the same points of interest.

It should be appreciated that the HLOS 106 and the mapping tables 120 and 122 may also be configured to support a managed runtime execution model involving, for example, a virtual machine 118 (FIG. 1). In this regard, the integrated platform mechanism(s) described above enable the system 100 to determine desired or target high-level functional information from the executing application binary code 108. An exemplary embodiment of the managed runtime execution model is illustrated in FIGS. 5-10.

In embodiments involving managed runtime or virtual machine execution, JavaScript sources and/or bytecode/just-in-time (JIT) binary for the JavaScript sources may be read from different parts of a virtual machine (VM) heap with the aid of another table (e.g., the identifier-to-address mapping table (IVAMT) 122). The IVAMT 122 comprises virtual memory addresses for important boundaries of the VM heap. It may further comprise other types of entries where virtual addresses for various functional points of the virtual machine 118 or the application binary 108 could be maintained. It should be appreciated that the IVAMT 122 may be generally used for virtual addresses for specific functional points that may be updated and/or determined dynamically during application execution. In this regard, the IVAMT 122 may map a functional point to the virtual address. The VAFMT 120, on the other hand, may map a statically defined virtual address to a functional meaning. Therefore, the VAFMT 120 may not change during application execution but may be updated by, for example, other-the-air (OTA) updates to a computing device. It should be further appreciated that other miscellaneous tables may be associated with the VAFMT 120 and the IVAMT 122. The miscellaneous tables may comprise various macro or parameter names mapped to their parameter values or settings that are not virtual addresses.

Figure 9:
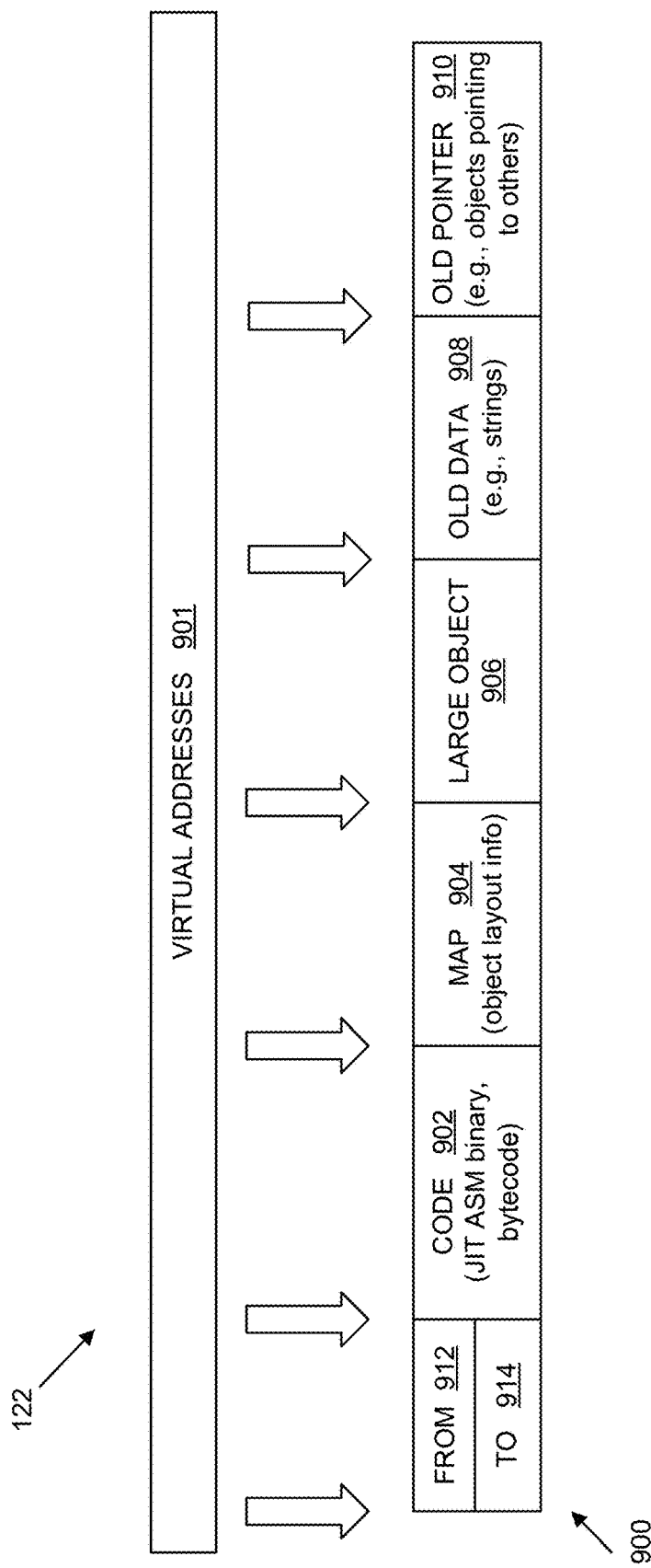
FIG. 9 illustrates an exemplary mapping of virtual addresses for external/internal boundaries for a virtual machine heap.

In the embodiment of FIG. 9, virtual memory addresses 901 are identified for various external and/or internal boundaries of an exemplary VM heap structure 900. As illustrated in FIG. 9, the VM heap structure 900 may comprise a plurality of data fields identifying various internal and/or external boundaries, including, for example, a from field 912, a to field 914, a code field 902, a map field 904, a large object field 906, an old data field 908, and old pointer fields 910. The VM heap is a VM managed memory region that is allocated in the native system heap. As known in the art, in the VM Heap, the VM performs abstraction of, for example, memory management, allocating and deallocating the code (e.g., JavaScript source), the bytecode, intermediate code, JITed binary, the objects created during execution, and all other associated housekeeping information and internal data structures used for the execution of the program (e.g., JavaScript program). As further illustrated in FIG. 9, the VM heap region may comprise various sub-regions (e.g., 910, 908, 906, 904, 902, 912, and 914) depending on the type of things the VM stores. Sub-regions 912 and 914 may be used to contain the objects created for the first time and any garbage collection activity swaps the live objects from sub-regions 912 to 914 and vice versa. In an embodiment, sub-region 902 may be used to save JavaScript source, bytecodes, intermediate codes, and JITed binary/assembly codes. Sub-region 904 may be used to keep certain internal data structures associated with the objects created by the VM during execution of a program (e.g., JavaScript program). Sub-region 906 may be used to keep any kind of item (code, object) that is bigger than a predetermined size (e.g., 1 MB). Sub-regions 908 and 910 may keep objects and data that have survived multiple cycles of garbage collection with sub-region 908 focusing objects with constant values and sub-region 910 focusing on objects that points to other objects.

In operation, the HLOS 106 may identify and dynamically update the virtual memory addresses 901 in the IVAMT 122 as memory allocations change for the VM heap. It should be appreciated that a JavaScript virtual machine 118 keeps the sources in the heap until the function is active. The managed runtime or virtual machine execution model may involve identifying JavaScript sources and/or bytecode/JIT code from the VM heap. The VM heap objects holding JavaScript sources may be tracked for any new writes, and new JavaScript sources received by the virtual machine 118 may be identified. The identified JavaScript sources may be provided to the algorithm(s) 116 in the trusted zone 114, which extracts various features from the JavaScript code and uses them for detecting any malicious behavior. Examples of features extracted from the JavaScript code include the following or other features: document object model (DOM) modification and sensitive functions; a number of evaluations; a number of strings; a script length; string modification function(s); "built-ins" for de-obfuscation, etc.). The trusted zone 115 may feed the extracted features to the malicious code detection algorithms 116 to determine any malicious activity.

In certain embodiments, when only JIT binary/bytecodes are available, the features may be extracted from them and then sent to the malicious code detection algorithms 116. For example, the HLOS 106 may maintain a library of bytecode/JIT code sequences representing high-level JavaScript artifacts. Any matches of the bytecode/JIT code stream from the JavaScript functions in the VM code space with these artifacts may be recorded and passed to the malicious code detection algorithms 116 for the determination of malicious characteristics.

Figure 5:
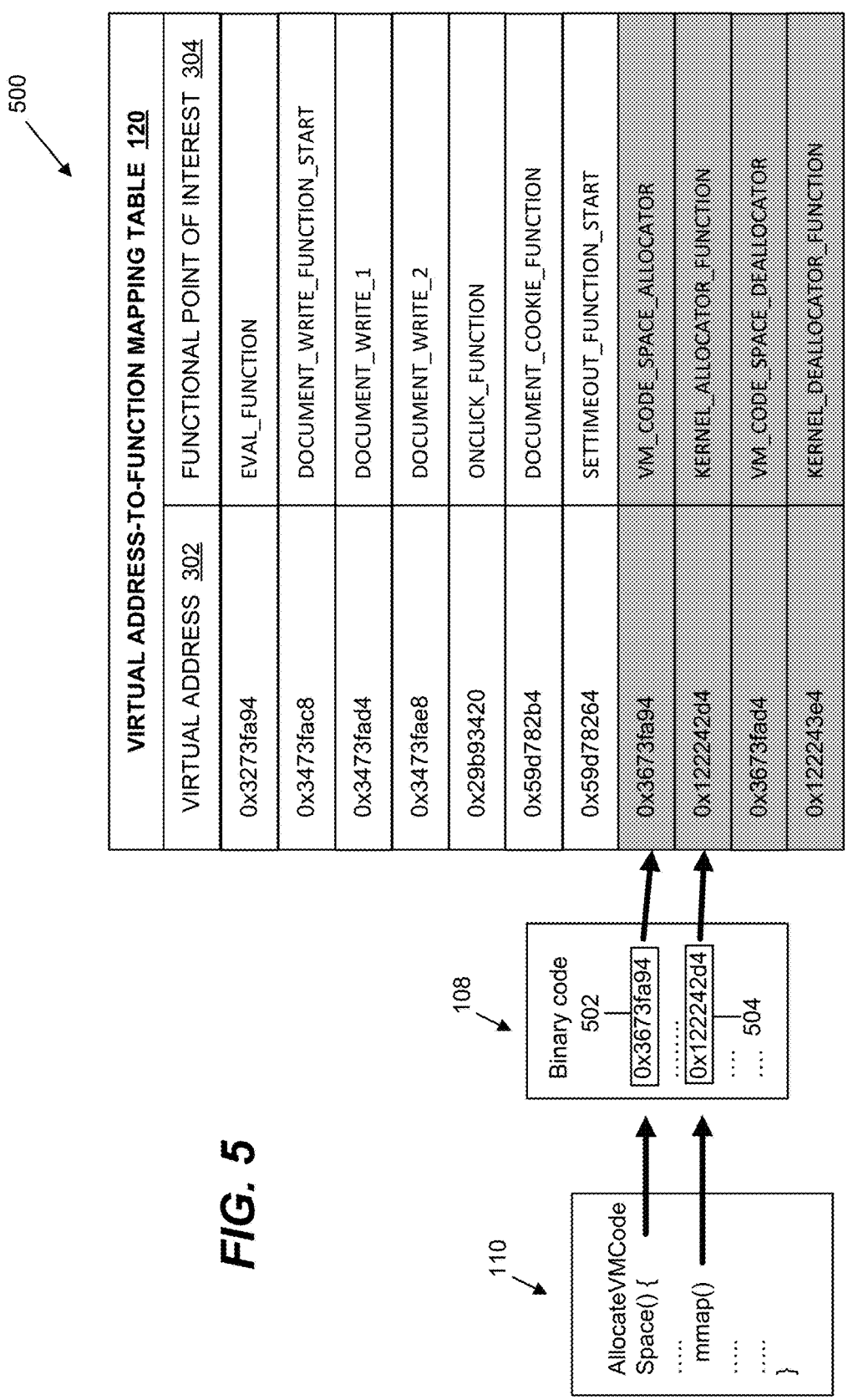
FIG. 5 illustrates another embodiment of a VAFMT used for dynamically identifying boundaries of a virtual machine code space.

FIGS. 5 & 6 illustrate an exemplary embodiment of the IVAMT 122 and the VAFMT 120 used during managed runtime or virtual machine execution. FIG. 5 illustrates a logical mapping 500 of target functionality related to allocation of a VM code space to corresponding application binary code 108. In this embodiment, the application source code 110 comprises code for a "AllocateVMCodeSpace" function. As illustrated in FIG. 5, a first point in the source code 110 may be mapped to a virtual addresses 502 in the binary code 108. A second point in the source code 110 may be mapped to a virtual address 504 in the binary code 108. In an example implementation, the function AllocateVMCodeSpace may be called when the VM during execution gets a new JavaScript source code that it needs to execute and it is determined that there is not much space in the current VM heap code space (902). This function may take the size of the new JavaScript code and determine the amount by which the VM heap code space needs to be increased in size so that the VM can save the JavaScript source, the associated bytecode or intermediate code and/or the JITed binary. Based on the determined size, the AllocateVMCodeSpace function may increase the allocated space of the VM heap code space in the native platform's heap using the system allocator functions, such a, mmap( ), malloc( ), calloc( ), or realloc( ). The mmap( ) function is a POSIX compliant Unix system call that maps a sequence of bytes starting at an offset from the other object specified by the file descriptor into memory, preferably at address start. The mmap( ) function returns the actual place where the object is mapped. Malloc( ), realloc( ), calloc( ) and free( ) comprise a group of functions in the C standard library for performing manual memory management for dynamic memory allocation in the C/C++ programming language. The virtual addresses 502 and 504 for the points of interest in the binary code 108 may be directly placed in the column 302 in the VAFMT 120. The functional meanings of the different points of interests represented by the virtual addresses may be listed as macro names in the column 304 of VAFMT 120. The detection algorithm(s) 116 (FIG. 1) may have a clear understanding of the functionality represented by the macros in column 304 of VAFMT 120. The macro name (in column 304) for a particular row in VAFMT 120 may distinctly identify the functionality that is being executed when the processor (e.g., CPU 102) executes the application's binary instruction at that virtual address point (in column 302). In this manner, by knowing the execution statistics, counts and profile of the virtual addresses for the points of interests, the detection algorithm(s) 116 fully understand the functionality being executed by the high level application binary. It should be appreciated that the mapping may be directly between the virtual address 302 and the functional meaning that is represented by the macro (304) and understood by the detection algorithm(s) 116 that performs the processing or detection, thereby eliminating a need to know the actual binary instruction at that virtual address point of interest.

The points of interest represented with virtual addresses and the macro meanings may determined offline and then populated in the VAFMT 120 for a particular application binary. Many types of applications may have available matching reference source code. For example, matching reference source code may be available for commonly available applications developed from popular open source projects (e.g., blink/Chromium based browsers, Webkit based browsers, various virtual machines in Android platforms, such as, Dalvik, ART, RenderScript). For applications with available matching reference source code, various offline mechanisms may be used to determine the virtual address for the points of interest in the commercial application binary for a corresponding expression/statement in the source code for those points of interest.

An exemplary embodiment for offline determination of the virtual addresses for the points of interest will be described. Certain important and useful functions in the source code 110 that implement the functionalities of interests may be identified in the matching reference source code. Various points within the source code 110 may be manually determined to form a unique set of points that together would represent a particular unique functionality. It should be appreciated that this may be equivalent to a set of sample points within the source code 110 that uniquely represent the overall functionality of the complete source code 110 for the functionality. The source code 110 may be compiled, assembled, and linked to a reference application that is equivalent to the actual commercial third party application. Both the binaries (reference and commercial third party) may originate from the same source code 110 and use similar build techniques (e.g., compile, assemble, link) and toolchains. As known in the art, open source applications may use freely available GCC or LLVM toolchains. The compiler, assembler, and linker tools may be used to generate a reference binary application and the virtual address points corresponding to the important points in the source code may be noted. Because the virtual addresses for the points of interest may comprise a direct mapping of the points of interest in the source code 110 from which the binary application is built (compiled, assembled, linked), the reference binary may be used offline to compare with the commercial binary to identify the virtual address points of interest in the commercial third party binary. It should be further appreciated that other offline or other techniques may be used to determine the virtual address for the points of interest in the commercial third party binary. In an embodiment, FIG. 2 shows how different points of interest (201, 203, 205) in the source code 110 may be directly mapped to the corresponding virtual addresses (202, 204, 206) in the binary 108.

FIG. 6 illustrates a logical mapping 600 between the VAFMT 120 of FIG. 5 and an exemplary IVAMT 122. The VAFMT 120 comprises virtual addresses of fixed and known points of interest in the binary application whose execution are of interest and are being tracked. These virtual addresses may be updated whenever the binary application changes. The IVAMT 122 comprises virtual addresses of specific points that are created or updated when the binary application executes, which may be dynamic and represent virtual addresses of dynamic items (e.g., runtime buffer start or end points). The left hand column (302) of VAFMT 120 comprise the virtual addresses, and the right hand column (304) may indicate the functional description that is present in the binary code 108 at that virtual address point. In this manner, the VAMFT 120 maps virtual address to functional meanings. In general, the IVAMT 122 comprises the reverse. In this case, the functional meaning or macro names are known, and the system determine the virtual address 602 where the functional meaning or the macro name 604 are implemented or available in the execution instance of the binary application. The virtual addresses in the IVAMT 122 may comprise dynamic values that are determined at runtime. For the case where the start and the end of a dynamically allocated buffer (or the virtual machine heap or its sub spaces) are determined, the virtual addresses for the points of interest within the functions in the binary application that are doing the dynamic buffer/heap-space allocation may be obtained from the VAFMT 120. The execution of these functions may be determined by detecting the execution of the virtual addresses in the VAMFT 120. Furthermore, the start/end virtual addresses of the buffer/heap-space allocation may be determined by detecting the system memory allocation functions invoked from these functions. These determined start/end virtual addresses of the buffer/heap-space allocations may be updated in the IVAMT (122).

Figure 7:
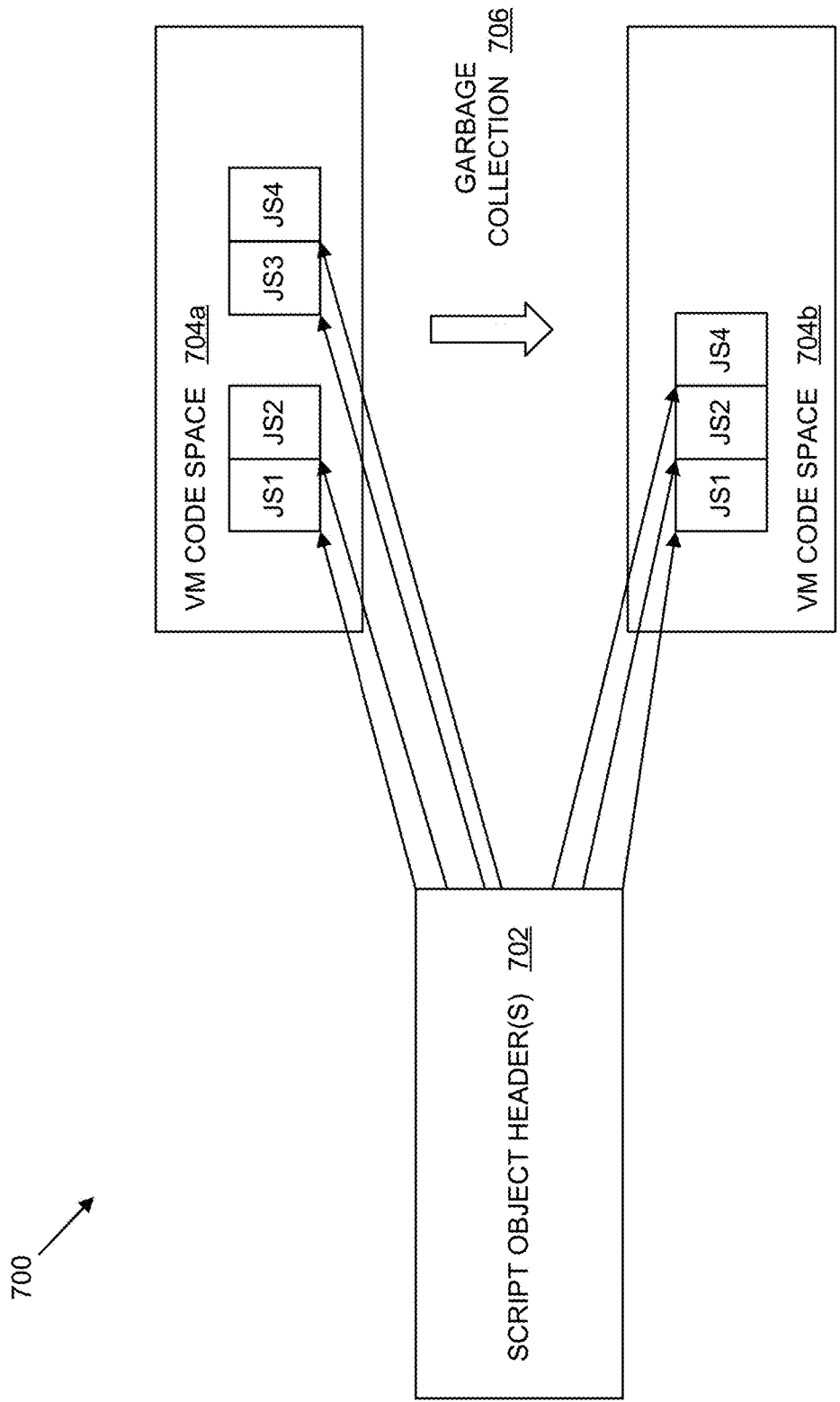
FIG. 7 shows a portion of a VM code space used in connection with a garbage collection process.
Figure 8:
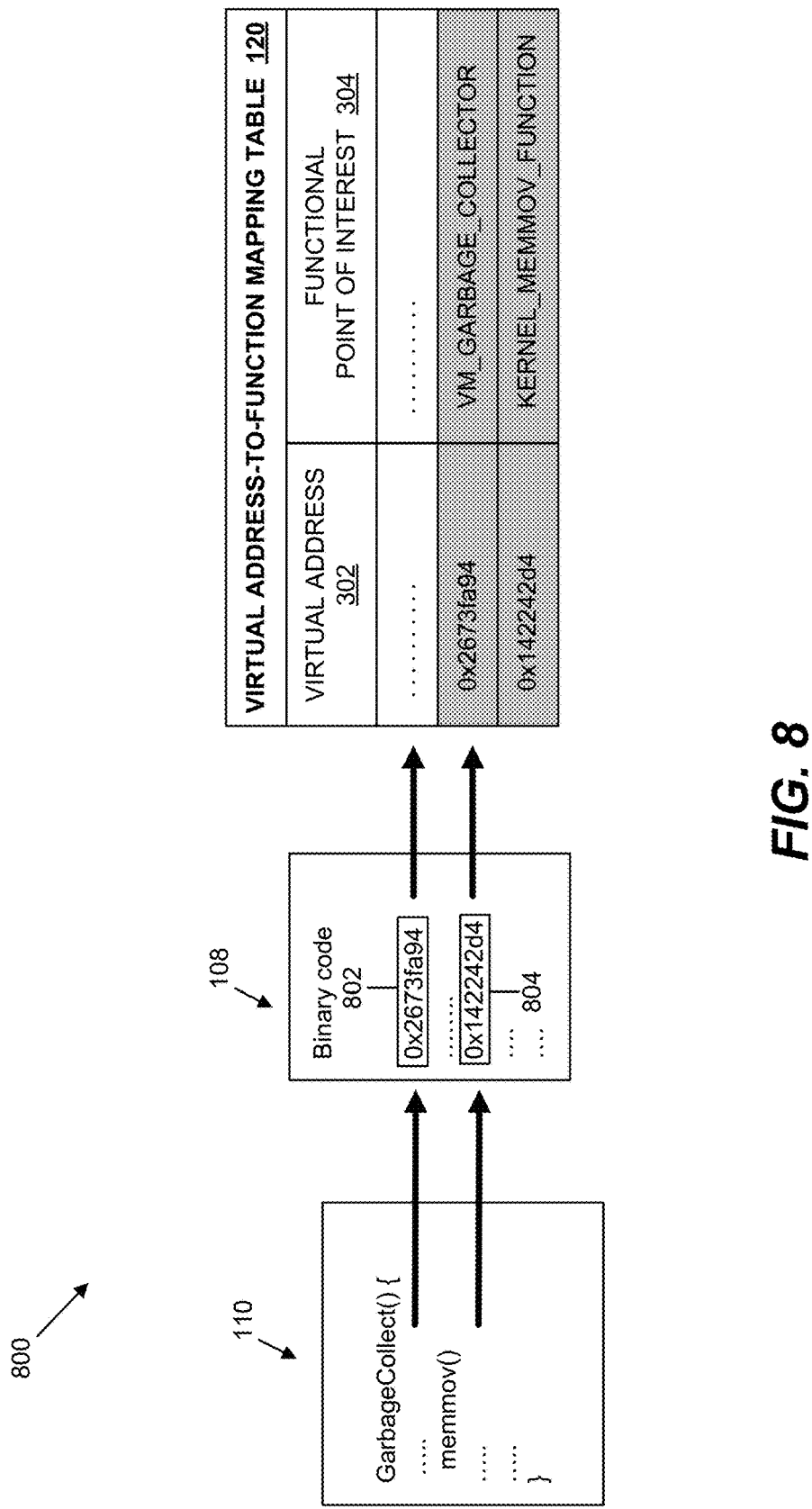
FIG. 8 shows exemplary points of interest for a garbage collection function in the virtual machine of FIG. 1 and the virtual addresses for the functional points of interest in the VAFMT that are used to detect the execution of the garbage collection activity during the execution of the application binary containing the virtual machine.

FIG. 7 shows the impact of garbage collection on the VM heap code space and how the JavaScript sources may be determined consistently in the presence of garbage collection activity of the virtual machine 118. It should be appreciated that garbage collection is an integral activity of a managed runtime or virtual machine because allocation of new objects and deallocation of dead (i.e., not in use) objects may be explicitly handled by the runtime or virtual machine 118. The activity of reclaiming dead (unused) objects from the managed VM heap is referred to as garbage collection. In this regard, when unneeded Script objects or other objects are reclaimed, the VM heap may be reorganized and existing objects moved around and compacted to make space for new object allocations. FIG. 7 shows the effect of such a garbage collection activity on VM heap code Space 704a. VM heap code space 704a comprises JavaScript Objects JS1, JS2, JS3, JS4. After a garbage collection event, they may be compacted with the removal of a JavaScript Object JS3 that was detected as unneeded or dead by the garbage collector and, therefore, reclaimed (deleted) from the VM heap code space 704b. However, any such movement (e.g., removal, compaction, etc.) of objects in the VM heap changes the virtual addresses start and end locations that determine where the JavaScript object resides. In an exemplary method, the virtual addresses may be changed by re-running the virtual address determination mechanism illustrated in FIGS. 5 & 6 for the VM heap and the various spaces within the heap (FIG. 9) after every garbage collection activity, thereby updating the virtual addresses with the new values if the Script Object moved during garbage collection. As illustrated in FIG. 8, the kernel may keep track of the object moves happening during garbage collection and the distance by which they move. By keeping track of the address offset the objects moved, the virtual address values for the start and the end of the JavaScript object in the VM heap code space may be updated. In a similar manner, the virtual address in IVAMT 122 for the VM heap's various code spaces may be updated by tracking the allocations/deallocations/moves of the various sub-spaces of the VM heap illustrated in FIG. 9.

Figure 10:
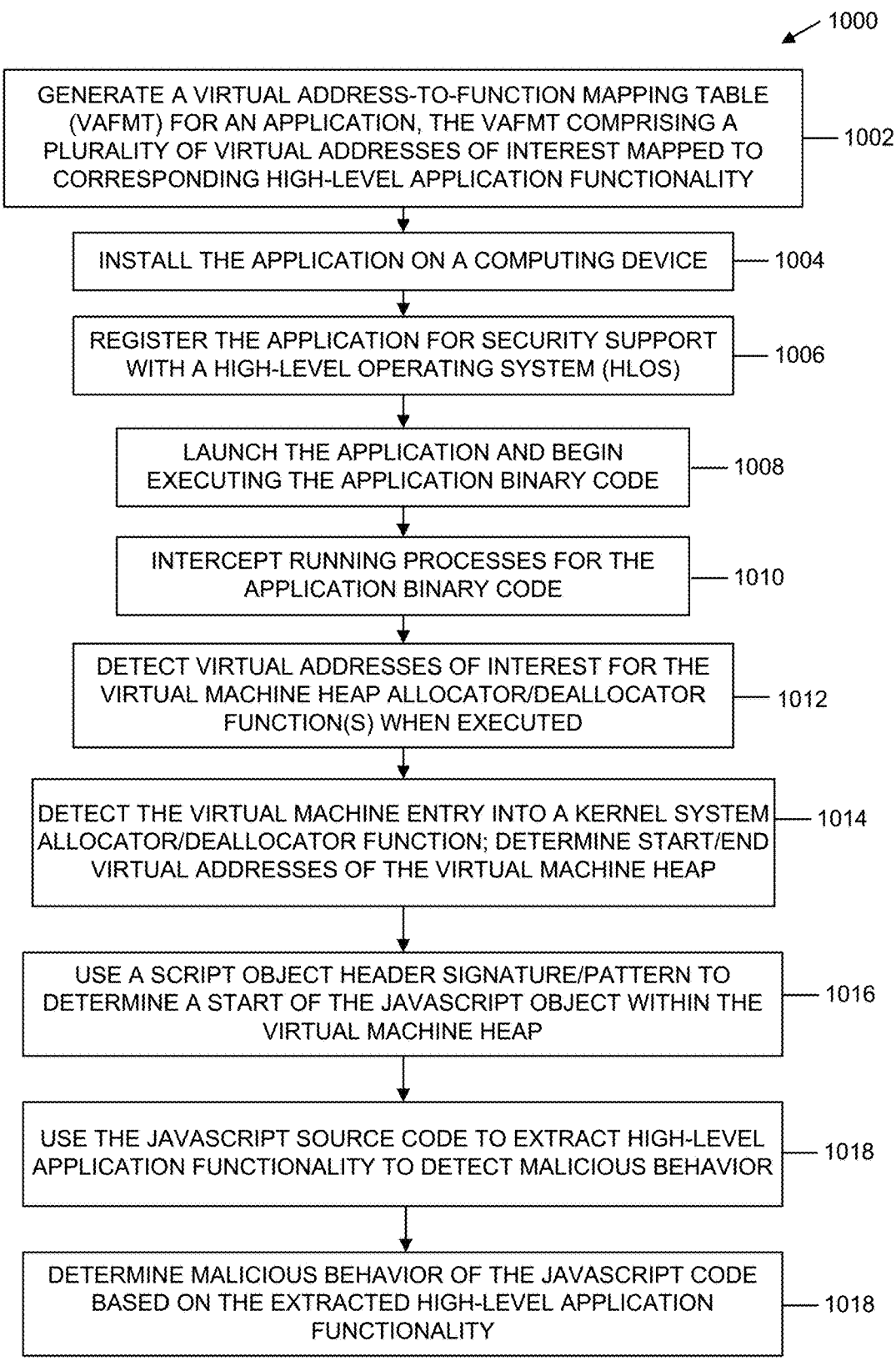
FIG. 10 is a flowchart illustrating an embodiment of a method for detecting malicious code activity in the system of FIG. 1 in a virtual machine embodiment.

FIG. 10 is a flowchart illustrating an embodiment of a method 1000 for detecting malicious code activity in a managed runtime or virtual machine execution model. It should be appreciated that the steps or functionality represented in blocks 1002, 1004, 1006, 1008, and 1010 in FIG. 10 may generally correspond to blocks 402, 404, 406, 408, and 410 described above in connection with the method of FIG. 4. At block 1012, the method 1000 detects the points of interest virtual addresses for the VM heap allocator/deallocator functions when executed. As illustrated at block 1014, when the execution is detected to be inside a VM heap allocator/deallocator function, the method 1000 may detect the entry VM into the kernel's system allocator/deallocator function and record the system memory allocation/deallocation. Based on that, the method 1000 may compute and determine the start/end virtual addresses of the VM's heap. By implementing similar mechanism(s) for a specific allocation region for the VM heap (e.g., code space, large object space, etc.), the start/end virtual addresses for the specific sub-regions (e.g., code space, large object space, etc.) within the VM heap may be determined. A illustrated at block 1016, once the VM heap space used to store the JavaScript Source Code objects are determined at block 1014, the method 1000 may use a Script Object Header signature/pattern (in binary) to determine the start of the JavaScript Object within the VM heap. The length of the JavaScript Object may be extracted from the header and used to extract the entire JavaScript Source code. As illustrated at block 1018, the JavaScript source code may be used to extract specific features of interest used by the detection algorithm(s) 116 to detect, for example, malicious behavior. At block 1020, the malicious behavior of the JavaScript code may be determined based on, for example, the features extracted from the JavaScript source in block 1018.

As mentioned above, the VAFMT 120 may be initially configured in an off-line manner and provided to the computing system 100 (FIG. 1). In an embodiment, when a new version of the application binary code 108 is made available to the computing system 100, the VAFMT 120 may be similarly updated in an off-line manner and provided to the computing system 100 via, for example, a communication network (referred to as an "over-the-air (OTA) update"). Updating the VAFMT 120 in this manner may be a disadvantage for binary applications that are frequently updated. It should be appreciated that a relatively large portion of the binary code in the updated version of the application binary code 108 may remain unchanged. The functional points of interest 304 identified in the VAFMT 120 may comprise a relatively limited portion of the application binary code 108 and/or binary code that may be unchanged from version-to-version.

For example, compiler operations and/or settings may infrequently change and the various modules in the binary code may maintain similar or predetermined offsets among the modules. FIGS. 12-16 illustrates various mechanisms that may be implemented in the computing system 100 for automatically updating the virtual addresses in the VAFMT 120 when a new or updated version of the application binary code 108 is installed.

It should be appreciated that these mechanisms may reduce the need for OTA updates of the VAFMT 120 for various types of applications and/or use cases. For example, in the context of web security applications, these mechanisms may eliminate the need for OTA updates for many of the most frequent types of updates to web browser applications that are based on the same originating codebase. Existing web browser applications may update binary application code on a weekly or monthly basis. Virtual addresses for the new binary version may change even when the source code has not changed for the specific modules related to the functional points of interest 304. In this case, the virtual addresses may change where there are source code changes in parts of the application other than the functional points of interest 304, or changes in variable types and data structure types (e.g., C++ classes, C-structures, unions, etc) accessed in other parts of the application. Furthermore, certain kinds of changes in compiler, assembler, and linker options may result in virtual changes in other parts of the application.

Figure 12:
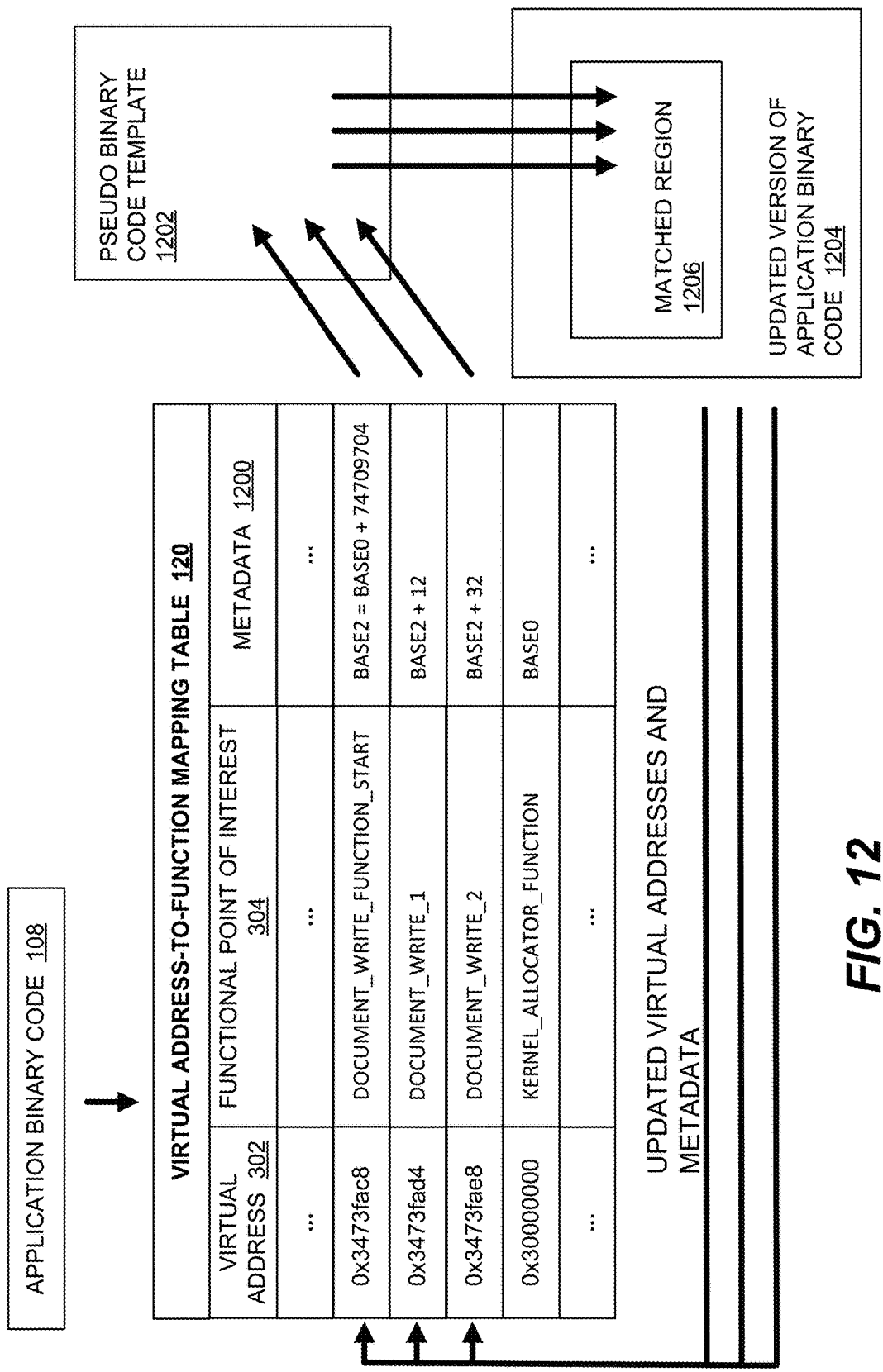
FIG. 12 is a combined block/flow diagram illustrating an embodiment of system for automatically updating the VAFMT in response to receiving an updated version of the application binary code.

FIG. 12 illustrates an embodiment of exemplary mechanisms that may be implemented in the computing system 100 for automatically updating the VAFMT 120 when a new or updated version of the application binary code 108 is installed. As illustrated in FIG. 12, the VAFMT 120 may be supplemented with metadata 1200 and one or more pseudo binary code templates 1202. As described below in more detail, the metadata 1200 and the pseudo binary code templates 1202 may enable the HLOS 106 to determine new virtual addresses 302 for the functional points of interest 304 when the application binary code 108 is updated with a new version.

It should be appreciated that the pseudo binary code template 1202 comprises a sequence of operation statements using symbolic representation for storage locations in memory and pseudo-registers for local variables. The pseudo binary code template 1202 may use various categories of pseudo registers that indicate their purpose. In an embodiment, an ArgumentReg# may denote pseudo registers that pass arguments to subroutines. A ReturnReg may comprise the return address when returning back from a subroutine call. A ProgCounter may comprise the current address pointed by the program counter of the processor. A ReturnValueReg# may denote the registers used to return values from subroutine calls back to the caller code. The operations may comprise close representations of the assembly operations in the processor with inputs and outs that can be variables or storage locations. For example, an AddWord variable may indicate an addition operation of operands of sizes 4-bytes or 1-word. A LoadWord variable may indicate loading a value from memory that is of a predetermined size (e.g., 4 bytes or 1 word). A LoadByte variable may indicate loading a value from memory that is of a predetermined size (e.g., 1 byte). A branchEQ may comprise a conditional branch that branches to the target provided as an operand if the previous comparison operation results in the equality of the operands being compared. The addressing modes or address computation may be separated from the load or the store operations. In an embodiment, a load operation with a base register and an offset may be split into two operations: an add operation that computes the final address by adding the constant offset value to a pseudo register, followed by the actual load operation that uses the pseudo register containing the computed final address. This may be done to keep the representation in a most generic form as addressing modes of various forms can be used by the updated application binary. The operation arguments that are constants may be represented by a number of bits that is needed to encode the valid range of constants.

For example, a constant "Const8bits" may be used as an operand for an operation that indicates that the operand is any valid value that can be encoded by 8 bits and, therefore, determine the valid dynamic range of values allowed. Some operands may be hard-coded constants (e.g., "#8" indicating the value '8'). The operands of the direct branch operation may be represented as an offset from the current program counter (e.g., ("ProgCounter+#Const20bits", or "ProgCounter+#12")). A pseudo binary code template 1202 may implement the functionality of interest using these or other operation statements. It should be appreciated that the operation statements may be used to identify the region in the new updated binary that implements the exact functionality via, for example, a matching functionality or module. The matching module is configured to understand both the format and the representation of the pseudo binary code template 1202 and the actual binary of the application. The matching module may perform an operation-by-operation comparison within a window of operations to detect matches, or use control-data-flow and the operations within the control-data-flow region for comparison.

Various matching techniques may be used. The operation statements in the pseudo binary code template 1202 may use Static Single Assignment (SSA) representation, where a particular pseudo register variable is assigned only once, thereby exposing the true dependencies among the operation statements. The SSA representation may enable improved matching of the functionality region in the updated binary of the application. The term "pseudo" refer to the fact that the representation is not a binary executable and does not use actual assembly instructions, registers, and addressing mode of the processor and is not assembled into binary code. The pseudo binary code template 1202 provides the functionality reference that the matching module uses as a template pattern and guideline to detect the functionality of interest in the updated binary of the application. It should be appreciated that the actual format and representation of the pseudo binary code template 1202 is implementation dependent and various other alternatives can be used. In other embodiments, some implementations may use the actual assembly instruction representation or representation(s) that resemble the assembly representation for the CPU 102 on which the binary application runs.

As described above, the HLOS 106 may maintain a list of registered applications 112. For each registered application, the HLOS 106 maintains tables (e.g., VAFMT 120, IVAMT 122) comprising virtual addresses 302 for functional points of interest 304. As illustrated in FIG. 12, one or more virtual addresses 302 in the VAFMT 120 may be associated with a pseudo binary code template 1202. In the embodiment of FIG. 12, the pseudo binary code template 1202 is associated with a set of virtual addresses 302 for a particular set of functional points of interest 304 representing a unique functionality (documentWrite function). The pseudo binary code template 1202 comprises pseudo code instruction(s) generically equivalent to the binary code covering the documentWrite function. In an embodiment, the pseudo binary code template 1202 may not use the processor instruction set architecture (ISA) and need not be assembled into actual binary code. The pseudo binary code template 1202 may use operation statements similar to assembly operations and use pseudo registers and symbolic references for storages. Through the use of a sequence of such operation statements, the pseudo binary code template 1202 may implement the functionality of interest that it represents (e.g., functionality of "documentWrite" function in the above example) that is the same as or equivalent to the functionality of interest (e.g., the documentWrite function) implemented in the actual binary of the application. It should be appreciated that the computing system 100 may include any number of pseudo binary code templates 1202. The number of different pseudo binary code templates 1202 may be such that all the different functionalities captured in the VAFMT 120, through the different sets of functional points of interest, have at least one representative pseudo binary code template 1202 that is used for updating the virtual addresses for the function points it covers when a new application binary code is installed.

In an embodiment, the pseudo binary code template 1202 may comprise a generic form of the target assembly instruction(s), one or more pseudo registers, and memory access offsets from a generic base (e.g., global heap or stack, a symbol/variable name) representing a specific reference points in memory. The metadata 1200 generally comprises a virtual-address free representation using, for example, a byte offset. The metadata 1200 for the virtual address (0x3473fac8) comprises a byte offset (BASE2=BASE0+ 74709704). The metadata 1200 for the virtual address (0x3473fad4) comprises a byte offset (BASE2+12). The metadata 1200 for the virtual address (0x3473fae8) comprises a byte offset (BASE2+32). It should be appreciated that this metadata may form a unique set corresponding to the set of three virtual address points of interest that uniquely represents the "document_write" functionality.

The pseudo binary code templates 1202 may be initially generated in an off-line manner, provided to the computing system 100, and stored in the secure storage of the device. It should be appreciated that the pseudo binary code templates 1202 may only need to be updated when there is a noticeable change in, for example, code and/or data structures in a region covered by the functional points of interest 304. These types of changes may be relatively infrequent (e.g., once per 6 months). Updates of this or other types may be implemented via an OTA update. This may enable a significant reduction of OTA updates of the virtual addresses from, for example, a weekly/monthly basis to only doing the OTA updates of the pseudo binary code templates 1202 once per 6 months.

An update or a re-install of a new binary version for an existing registered application may be detected. In response, the metadata 1200 and the pseudo binary code templates 1202 may be used to automatically update the VAFMT 120. As illustrated in FIG. 12, the pseudo binary code templates 1202 may be used to pattern match a region 1206 of the binary code in the new application where the functional points of interest 304 represented by pseudo binary code templates 1202 (and hence the virtual address points of interests that this particular pseudo binary code template represents) are located. The metadata 1200 may be used to focus the region 1206 to be searched in the updated version 1204 of the application binary code 108. Initial attempts may be made to search on a focused region 1206 (e.g., a predetermined percentage before and after the base, BASE2) by using a relative OFFSET from an original base (BASE0) for the functional points of interest 304 for a unique functionality. It should be appreciated that in many types of frequent updates these relative offsets remain close by. As further illustrated in FIG. 12, when a match is detected, the new virtual addresses may be obtained from the new binary, and the VAFMT 120 may be updated to reflect the new virtual addresses. If one or more functional points of interest 304 fail to yield a match in the new binary, the computing system 100 may initiate an OTA update or, in other embodiment, delete the specific functionality of interest and the associated virtual addresses from the VAFMT 120 based on the importance of the particular functionality.

FIG. 13 shows the VAFTM 120 from FIG. 12 with updated virtual addresses (represented by grey-out boxes). The virtual address 302 corresponding to the DOCUMENT_WRITE_FUNCTION_START point of interest 304 has been updated to a new virtual address (0x3133b61c). The virtual address 302 corresponding to the DOCUMENT_WRITE_1 point of interest 304 has been updated to a new virtual address (0x3133b62c). The virtual address 302 corresponding to the DOCUMENT_WRITE_2 point of interest 304 has been updated to a new virtual address (0x3133b62c). As further illustrated in FIG. 12, the metadata 1200 corresponding to the virtual addresses may also be updated. As illustrated in FIG. 13, metadata 1200 for the new virtual address (0x3133b61c) has been updated to "BASE2=BASE0+ 74709000". This illustrates that there has been a slight relative position change between the two functionalities of interest in the updated binary of the application (i.e., between the "KERNEL_ALLOCATOR_FUNCTION" and the "DOCUMENT_WRITE_FUNCTION"). The change may be relatively slight. For example, the change may be a reduction in 704 bytes out of the total original distance of 74709704 bytes between them. Therefore, with the search having been focused with some tolerance before and after the base offset metadata (i.e., 74709704 bytes) between the two functionalities of interest allows for effective matches by narrowing the search region. Metadata 1200 for the new virtual address (0x3133b62c) has been updated to BASE2+ 16. Metadata 1200 for the new virtual address (0x3133b640) has been updated to BASE2+36.

FIGS. 14 & 15 illustrate an exemplary embodiment of a pseudo binary code template 1202 associated with a set of functional points of interest 304 related to a DOCUMENT_WRITE_function. The set of functional points of interest 304 comprises a DOCUMENT_WRITE_FUNCTION_START module, a DOCUMENT_WRITE_1 module, and a DOCUMENT_WRITE_2 module. As illustrated in FIG. 14, each of the functional points of interest 304 in the set are directly associated with specific pseudo code instructions that form the "pseudo binary instruction points of interest" within the pseudo binary code template 1202. These "pseudo binary instruction points of interest" within the pseudo binary code template 1202 comprise the one-to-one mapping of the virtual address points of interest in the current VAFMT 120 with the new virtual address points of interest in the updated version of the application binary depending on the specific binary instructions in the updated application binary that directly matched with the "pseudo binary points of interest". As illustrated in FIG. 14, the DOCUMENT_ WRITE_FUNCTION_START module is associated with a "push" operation that saves the first two caller saved pseudo registers (CallSave0, CallSave1) and the Return register (ReturnReg). It is followed by an AddWord operation that computes the address required by the subsequent LoadWord operation. The AddWord operation adds a constant value that should fit in 8 bits with the program counter and saves the result in pseudo register reg0. The subsequent LoadWord operation directly uses the address in reg0 as the address to load the value from. In the actual binary for the application, the AddWord with the 8 bit constant can be directly included in the LoadWord instruction as a part of the addressing mode. The 'Const8bits' allows the option to have any constant value that fits in 8-bits. The loaded value is kept in the pseudo register reg1 and is used as the address for the second LoadWord operation that loads a value in pseudo register reg2. For the functional point of interest denoted by DOCUMENT_WRITE_FUNCTION_START, the "push" operation is the "pseudo binary instruction point of interest" in this pseudo binary code template 1202.

The DOCUMENT_WRITE_1 module is associated with a logical-shift-left operation by 16-bits of a value that is kept in pseudo register (reg0) and saved in pseudo register reg1. It is then added with the constant value '4' and saved in pseudo register reg2 that is then used as an address from which a value is loaded in pseudo register (reg3). It is to be noted that for the actual binary load instruction, the addressing mode could directly perform the addition by the constant value 4, and hence the AddWord and the LoadWord could be represented by a single load instruction. The value in reg3 is further added to the program-counter value (PC) to create the final address in pseudo register reg4 that is the address from which a byte value is loaded into the first argument register 'ArgumentReg0' that is used to pass as the first argument to a called routine. After that there is a direct branch to the address that is at an offset which is a value that can fit in 20 bits. However, before the direct branch instruction there is an AddWord instruction that saves the address to return to (by properly setting the ReturnReg) after the direct branch takes the control to a different part of the application. The "logical-shift-left" operation is the "pseudo binary instruction point of interest" in this pseudo binary code template 1202 for the functional point of interest denoted by DOCUMENT_WRITE_1.

The DOCUMENT_WRITE_2 module is associated with an AddWord operation that adds a constant value that can fit in 8bits with the program counter and keeps the result in pseudo register reg0. The pseudo register reg0 is then used as an address from which a value is loaded in pseudo register (reg2). It is followed by another AddWord operation that adds the pseudo register (reg2) and the current value of the program counter and keeps the result in pseudo register reg1. The pseudo register reg1 is then used as an address from which a value is loaded in the ArgumentReg0 that is used to pass a value to the subsequent subroutine call through a direct branch instruction. It is to be noted that for the actual binary load instruction, the addressing mode could directly perform the addition by the constant value, and hence the AddWord and the LoadWord could be represented by a single load instruction in the actual binary of the application. After the LoadWord operation, there is a direct branch to the address that is at an offset which is a value that can fit in 20 bits. However, before the direct branch instruction there is an AddWord instruction that saves the address to return (by properly setting the ReturnReg) to after the direct branch takes the control to a different part of the application. The call to the subroutine is followed by two sets of comparisons and branching to nearby locations within the pseudo binary code template 1202. Both the comparisons are done on the first Subroutine Return Value Register (ReturnValueReg0) to check for specific values ('0' and '1') returned by the subroutine and based on the returned value doing branches locally using BrnachEQ and BranchNE operations respectively. The branch target addresses are provided as a Constant offset from the current program counter value. The AddWord operation that adds the Const8bits operand with the program counter is the "pseudo binary instruction point of interest" in this pseudo binary code template 1202 for the functional point of interest denoted by DOCUMENT_WRITE_2. It is to be noted that the actual binary of the application could have this address computation operation (AddWord) together with the LoadWord operation in the pseudo binary code template match to a single actual binary instruction (as "ldr r1, [pc,#80]), and in this case the actual binary instruction where the "pseudo binary instruction point of interest" matches either in full or as a subpart of, becomes the instruction that determines the updated virtual address in the new version of the binary of the application.

FIG. 15 illustrates the matching of each of the pseudo code instructions in the pseudo binary code template 1202 to equivalent corresponding binary code in the matched region 1206 of the updated version 1204 of the application binary code 108. In operation, when the pseudo binary code template 1202 matches the region 1206, the virtual addresses of the corresponding instructions in the binary code that match the functional points of interest 304 become the new virtual addresses and are updated in the VAFMT 120. The new base and offsets may be computed based on the new virtual addresses, and the metadata 1200 may be updated.

Figure 16:
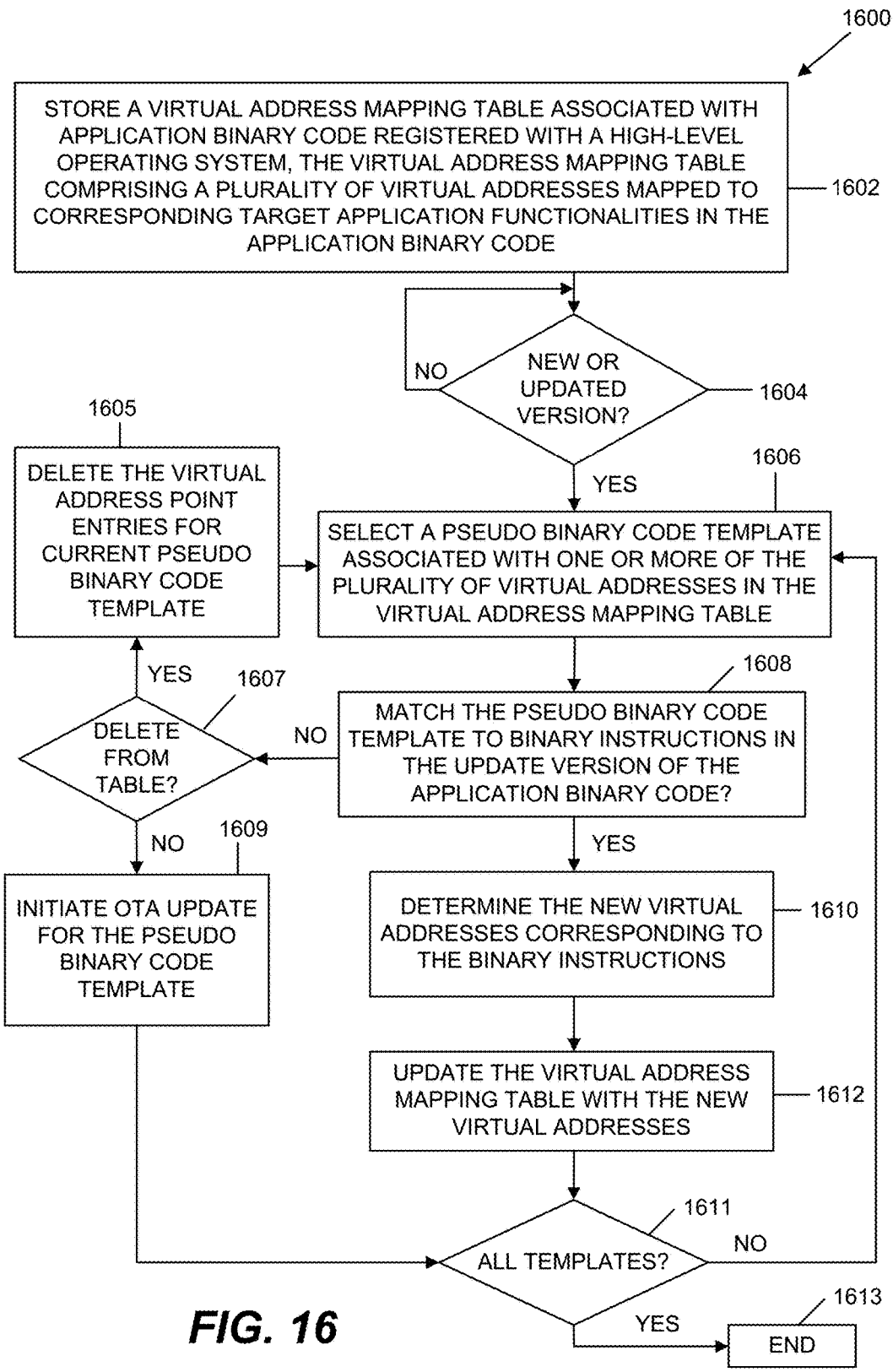
FIG. 16 is a flowchart illustrating an embodiment of a method for updating the VAFMT in response to receiving an updated version of the application binary code.

FIG. 16 illustrates an embodiment of a method 1600 implemented in the computing system 100 for automatically updating the VAFMT 120 when a new or updated version of the application binary code 108 is installed. At block 1602, a virtual address mapping table 120 for an application registered with the HLOS 106 may be stored in the computing system 100, as described above. The VAFMT 120 may be stored in a secure memory in the HLOS 106. As illustrated in FIG. 12, the VAFMT 120 may comprise a plurality of sets of virtual addresses 302 mapped to corresponding target application functionalities (functional points of interest 304) in the application binary code 108 for the registered application. In response to receiving an updated version 1204 of the application binary code 108 (decision block 1604), the corresponding pseudo binary code templates 1202 associated with one or more of the plurality of sets of virtual addresses 302 in the virtual address mapping table 120 may be determined (block 1606). As mentioned above, in an embodiment, the pseudo binary code templates 1202 may initially be acquired through over-the-air (OTA) updates to the system 100 together with the initial VAFMT 120, or by any other means of downloading and installing code/date on the system 100. Both these pseudo binary code templates 1202 and the VAFMT 120 may be stored in the system 100 in locations accessible by the HLOS 106 and the kernel. The actual storage location is implementation dependent. Various levels of security protection or secure memory configurations can be considered for the storage locations and is dependent on the implementation choice. The pseudo binary code templates 1202 may be updated when, for example, one or more of the existing templates are not able to find any matches in the updated binary of the application. Mismatches may happen due to large scale change in the application code in the regions of interests, or other kinds of changes described above. During such situations, updated pseudo binary code templates 1202 and an updated VAFMT 120 may be OTA downloaded and installed in the system 100. At decision block 1608, the pseudo binary code template 1202 is used to search the updated version 1204 of the application binary code 108 and match the pseudo code instruction(s) to the equivalent binary instructions. When matches are found, at block 1610, the new virtual addresses corresponding to the binary instructions are determined. At block 1612, the virtual address mapping table 120 may be updated with the new virtual addresses and corresponding updated base/offset metadata 1200.

As illustrated in FIG. 16, blocks 1606, 1608, 1610, and 1612 may be iterated for all the different pseudo binary code templates 1202 until all the pseudo binary code templates 1202 are matched and all the virtual addresses in the VAFMT 120 are updated. At decision block 1611, the method 1600 may determine if all pseudo binary code templates 1202 have been processed. If "yes", the method 1600 may end at block 1613. If "no", a new pseudo binary code template 1202 may be selected at block 1606. At decision block 1608, as matching binary sequences are identified in the updated binary of the application for a particular pseudo binary code template 1202, the method 1600 may iterate to the next pseudo binary code template 1202 for matching. If at some iteration there is no match for a pseudo binary code template 1202 in the updated binary of the application, it is first determined if the functionality of interest, represented by the pseudo binary code template 1202, can be deleted from the VAFMT 120 (decision block 1607). If it can be deleted (which may be due to different reasons, including the importance of the functionality being low), all the virtual address point of interest entries for this functionality of interest may be deleted from the VAFMT 120 (block 1605) and the iteration continues to block 1606 to search for a match for the next pseudo binary code template 1202. However, if the functionality (and hence the pseudo binary code template 1202) is important and should not be deleted (block 1609), an automatic update mechanism fails, in which case a complete over-the-air (OTA) update for the virtual addresses and/or the pseudo binary code templates 1202 may be performed. This may represent the case where there is a drastic change/modification in the updated binary of the application (e.g., that happens with less frequency, once in a 6-month).

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for detecting high-level functionality of an application executing on a computing device, the method comprising:
storing, in a secure memory on a computing device, a plurality of virtual address mapping tables, each virtual address mapping table corresponding to one of a plurality of applications, each virtual address mapping table comprising a plurality of virtual addresses of the application binary code mapped to corresponding target application functionalities in source code of the application;

registering the application with a high-level operating system (HLOS); and during execution of the application binary code, the HLOS detecting when one or more of the virtual addresses corresponding to the target application functionalities are executed based on the virtual address mapping table.

2. The method of claim 1, wherein the secure memory resides in a trusted zone in the HLOS.

3. The method of claim 1, further comprising:

updating the virtual address mapping table with revised virtual addresses for the target application functionalities when the application binary code is updated.

4. The method of claim 1, further comprising:

providing the executed target application functionalities as detected from the virtual addresses into an exception handling module configured to detect one or more exceptions or behaviors associated with execution of the application.

5. The method of claim 4, wherein the exception handling module comprises a malicious code detection algorithm.

6. The method of claim 1, wherein the application comprises one of a secure web application and a web browser.

7. The method of claim 1, wherein the application binary code is executed as native binary code.

8. The method of claim 1, wherein the application binary code comprises an associated virtual machine.

9. A system for detecting high-level functionality of an application executing on a computing device, the system comprising:

means for securely storing on a computing device, a plurality of virtual address mapping tables, each virtual address mapping table corresponding to one of a plurality of applications, each virtual address mapping table comprising a plurality of virtual addresses of the application binary code mapped to corresponding target application functionalities in source code of the application;

means for registering the application with a high-level operating system (HLOS); and means for detecting, during execution of the application binary code, when one or more of the virtual addresses corresponding to the target application functionalities are executed based on the virtual address mapping table.

10. The system of claim 9, wherein the secure memory comprises a trusted zone in the HLOS.

11. The system of claim 9, further comprising:

means for updating the virtual address mapping table with revised virtual addresses for the target application functionalities when the application binary code is updated.

12. The system of claim 9, further comprising:

means for providing the executed target application functionalities as detected from the virtual addresses into an exception handling module configured to detect one or more exceptions associated with execution of the application.

13. The system of claim 12, wherein the exception handling module comprises a malicious code detection algorithm.

14. The system of claim 9, wherein the application comprises one of a secure web application and a web browser.

15. The system of claim 9, wherein the application binary code is executed as native binary code.

16. The system of claim 9, wherein the application binary code comprises an associated virtual machine.

17. A computer program embodied in a memory and comprising a non-transitory computer usable medium having a computer readable program code embodied therein executable by a processor for detecting high-level functionality of an application executing on a computing device, the method comprising:

storing, in a secure memory on a computing device, a plurality of virtual address mapping tables, each virtual address mapping table corresponding to one of a plurality of applications, each virtual address mapping table comprising a plurality of virtual addresses of the application binary code mapped to corresponding target application functionalities in source code of the application;

registering the application with a high-level operating system (HLOS); and during execution of the application binary code, the HLOS detecting when one or more of the virtual addresses corresponding to the target application functionalities are executed based on the virtual address mapping table.

18. The computer program of claim 17, wherein the secure memory comprises a trusted zone in the HLOS.

19. The computer program of claim 17, wherein the method further comprises:

updating the virtual address mapping table with revised virtual addresses for the target application functionalities when the application binary code is updated.

20. The computer program of claim 17, wherein the method further comprises:

providing the executed target application functionalities as detected from the virtual addresses into an exception handling module configured to detect one or more exceptions or behaviors associated with execution of the application.

21. The computer program of claim 20, wherein the exception handling module comprises a malicious code detection algorithm.

22. The computer program of claim 17, wherein the application comprises one of a secure web application and a web browser.

23. The computer program of claim 17, wherein the application binary code is executed as native binary code.

24. The computer program of claim 17, wherein the application binary code comprises of an associated virtual machine.

25. A system for detecting high-level functionality of an executing application, the system comprising:

a processing device configured to execute application binary code; and a high-level operating system (HLOS) comprising a plurality of virtual address mapping tables, each virtual address mapping table corresponding to one of a plurality of applications, each virtual address mapping table comprising a plurality of virtual addresses of the application binary code mapped to corresponding target application functionalities in source code of the application, the HLOS configured to detect when one or more of the virtual addresses corresponding to the target application functionalities are executed.

26. The system of claim 25, wherein the secure memory comprises a trusted zone in the HLOS.

27. The system of claim 25, wherein the HLOS further comprises an exception handling module configured to receive the executed target application functionalities as detected from the virtual addresses and detect one or more exceptions associated with execution of the application.

28. The system of claim 27, wherein the exception handling module comprises a malicious code detection algorithm.

29. The system of claim 25, wherein the application comprises one of a secure web application and a web browser.

30. The system of claim 25, wherein the application binary code comprises of an associated virtual machine.

\* \* \* \* \*